United States Patent
Firminger et al.

(10) Patent No.: US 8,224,956 B2
(45) Date of Patent: *Jul. 17, 2012

(54) HYPOTHESIS SELECTION AND PRESENTATION OF ONE OR MORE ADVISORIES

(75) Inventors: Shawn P. Firminger, Redmond, WA (US); Jason Garms, Redmond, WA (US); Edward K. Y. Jung, Bellevue, WA (US); Chris D. Karkanias, Sammamish, WA (US); Eric C. Leuthardt, St. Louis, MO (US); Royce A. Levien, Lexington, MA (US); Robert W. Lord, Seattle, WA (US); Mark A. Malamud, Seattle, WA (US); John D. Rinaldo, Jr., Bellevue, WA (US); Clarence T. Tegreene, Bellevue, WA (US); Kristin M. Tolle, Redmond, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 507 days.

This patent is subject to a terminal disclaimer.

(21) Appl. No.: 12/456,249

(22) Filed: Jun. 12, 2009

(65) Prior Publication Data

US 2010/0131891 A1    May 27, 2010

Related U.S. Application Data

(63) Continuation-in-part of application No. 12/313,659, filed on Nov. 21, 2008, now Pat. No. 8,046,455.

(51) Int. Cl.
*G06F 15/16* (2006.01)
*G06F 11/30* (2006.01)

(52) U.S. Cl. ........ 709/224; 709/206; 709/217; 709/203; 706/11; 706/46; 706/54; 706/12; 706/59; 715/810; 715/764; 702/185; 702/183

(58) Field of Classification Search .................. 709/224, 709/206, 217, 203
See application file for complete search history.

(56) References Cited

U.S. PATENT DOCUMENTS

| 3,599,149 A | 8/1971 | Pardoe |
| 6,697,800 B1 | 2/2004 | Jannink et al. |

(Continued)

FOREIGN PATENT DOCUMENTS

WO    WO 99/18842    4/1999

OTHER PUBLICATIONS

"Find Patterns in Data that Identify Combinations of Events that Occur Together"; SPSS Association Rule Components; Bearing a date of 2002; 5 Total Pages; SPSS Inc.; located at: http://www.spss.com/spssetd/files/AssocRuleTech.pdf.

(Continued)

*Primary Examiner* — Jude Jean Gilles

(57) ABSTRACT

A computationally implemented method includes, but is not limited to: selecting at least one hypothesis from a plurality of hypotheses relevant to a user, the selection of the at least one hypothesis being based, at least in part, on at least one reported event associated with the user; and presenting one or more advisories related to the hypothesis. In addition to the foregoing, other method aspects are described in the claims, drawings, and text forming a part of the present disclosure.

43 Claims, 17 Drawing Sheets

U.S. PATENT DOCUMENTS

| | | | |
|---|---|---|---|
| 6,952,658 B2* | 10/2005 | Greulich et al. | 702/185 |
| 7,203,430 B2 | 4/2007 | Ohta | |
| 7,400,928 B2 | 7/2008 | Hatlestsad | |
| 7,627,544 B2 | 12/2009 | Chkodrov et al. | |
| 8,010,604 B2 | 8/2011 | Lapstun et al. | |
| 8,046,455 B2* | 10/2011 | Firminger et al. | 709/224 |
| 8,127,002 B2* | 2/2012 | Firminger et al. | 709/224 |
| 2003/0166277 A1 | 9/2003 | Zauderer et al. | |
| 2004/0010184 A1 | 1/2004 | Kenknight et al. | |
| 2004/0103108 A1 | 5/2004 | Andreev et al. | |
| 2005/0015217 A1* | 1/2005 | Weidl et al. | 702/185 |
| 2005/0043922 A1* | 2/2005 | Weidl et al. | 702/183 |
| 2005/0049988 A1* | 3/2005 | Dahlquist et al. | 706/46 |
| 2005/0102578 A1 | 5/2005 | Bliss et al. | |
| 2006/0034430 A1 | 2/2006 | Liakis | |
| 2006/0058590 A1 | 3/2006 | Shaw et al. | |
| 2007/0293731 A1 | 12/2007 | Downs et al. | |
| 2008/0034056 A1 | 2/2008 | Renger et al. | |
| 2008/0059232 A1 | 3/2008 | Iliff | |
| 2008/0091515 A1 | 4/2008 | Thieberger et al. | |
| 2008/0215607 A1 | 9/2008 | Kaushansky et al. | |
| 2008/0218472 A1 | 9/2008 | Breen et al. | |
| 2008/0262872 A1 | 10/2008 | Perry et al. | |
| 2009/0049154 A1 | 2/2009 | Ge | |
| 2009/0077658 A1 | 3/2009 | King et al. | |
| 2009/0083208 A1* | 3/2009 | Raghavan et al. | 706/47 |
| 2009/0132197 A1 | 5/2009 | Rubin et al. | |
| 2009/0240647 A1* | 9/2009 | Green et al. | 706/52 |
| 2009/0276221 A1* | 11/2009 | Heiman et al. | 704/270 |
| 2009/0326981 A1* | 12/2009 | Karkanias et al. | 705/3 |
| 2010/0010866 A1 | 1/2010 | Bal et al. | |
| 2010/0088104 A1* | 4/2010 | DeRemer et al. | 705/1.1 |
| 2010/0092095 A1 | 4/2010 | King et al. | |

OTHER PUBLICATIONS

"Find Sequential Patterns in Data to Predict Events More Accurately"; SPSS Sequence Association™ Component; Bearing a date of 2002; pp. 1-5; SPSS Inc.; located at: http://www.spss.com/spssetd/files/sequencetech.pdf.

Hansen, et al.; "Microblogging—Facilitating Tacit Knowledge?"—A Second Year Term Paper; Information Management Study at Copenhagen Business School; Bearing a date of 2008; pp. 1-42; located at http://www.scribd.com/doc/3460679/Microblogging-as-a-Facilitator-for-Tacit-Knowledge.

Morales, et al.; "Using Sequential Pattern Mining for Links Recommendation in Adaptive Hypermedia Educational Systems"; Current Developments in Technology-Assisted Education; Bearing a date of 2006; pp. 1016-1020; FORMATEX 2006; located at http://www.formatex.org/micte2006/pdf/1016-1020.pdf.

Nesbit, et al.; "Sequential Pattern Analysis Software for Educational Event Data"; pp. 1-5; Simon Fraser University, Burnaby, Canada; located at: http://www.sfu.ca/~mzhou2/temp/MB2008_1.pdf.

Reiss, M.; "Correlations Between Changes in Mental States and Thyroid Activity After Different Forms of Treatment"; The British Journal of Psychology—Journal of Mental Science; Bearing dates of Mar. 6, 1954 and 1954; pp. 687-703 [Abstract only provided]; located at http://bjp.rcpsych.org/cgi/content/abstract/100/420/687; The Royal College of Psychiatrists.

Agger, Michael; "Every Day We Write the Book: What would happen if Facebook made its data available for research?"; Slate; bearing date of Nov. 30, 2010; printed on Dec. 10, 2010; pp. 1-3; located at: http://www.slate.com/formatdynamics/CleanPrintProxy.aspx?1292008532368.

"Self-tracking links to get you started"; The Quantified Self: self knowledge through numbers; printed on Dec. 10, 2010; pp. 1-5; located at: http://quantifiedself.com/self-tracking-links-to-get-you-started/.

Karimi, A. et al.; "A Predictive Location Model for Location-Based Services"; *GIS'03*; Nov. 7-8, 2003; pp. 126-133; ACM.

Ulicny, B. et al.; "New Metrics for Blog Mining"; Data Mining, Intrusion Detection, Information Assurance, and Data Networks Security 2007; Proceedings of the SPIE; 2007; 12 pages; vol. 6570.

U.S. Appl. No. 12/462,201, Firminger et al.
U.S. Appl. No. 12/462,128, Firminger et al.
U.S. Appl. No. 12/459,854, Firminger et al.
U.S. Appl. No. 12/459,775, Firminger et al.
U.S. Appl. No. 12/456,433, Firminger et al.
U.S. Appl. No. 12/455,317, Firminger et al.
U.S. Appl. No. 12/455,309, Firminger et al.
U.S. Appl. No. 12/387,487, Firminger et al.
U.S. Appl. No. 12/387,465, Firminger et al.
U.S. Appl. No. 12/384,779, Firminger et al.
U.S. Appl. No. 12/384,660, Firminger et al.
U.S. Appl. No. 12/383,817, Firminger et al.
U.S. Appl. No. 12/383,581, Firminger et al.
U.S. Appl. No. 12/380,573, Firminger et al.
U.S. Appl. No. 12/380,409, Firminger et al.
U.S. Appl. No. 12/378,288, Firminger et al.
U.S. Appl. No. 12/378,162, Firminger et al.
U.S. Appl. No. 12/319,135, Firminger et al.
U.S. Appl. No. 12/319,134, Firminger et al.
U.S. Appl. No. 12/315,083, Firminger et al.
U.S. Appl. No. 12/313,659, Firminger et al.

Buchanan, Matt; "Twitter Toilet Tweets Your Poo"; gizmodo.com; bearing a date of May 18, 2009; pp. 1-2; located at http://gizmodo.com/5259381/twitter-toilet-tweets-your-poo; printed on Jul. 1, 2009.

Diaz, Jesus; "One Day, This Will Be Remembered as the First Real Tricorder"; gizmodo.com; bearing a date of Nov. 12, 2009; pp. 1-2; located at http://gizmodo.com/5403126/one-day-this-will-be-remembered-as-the...; printed on Nov. 25, 2009.

Fox, Stuart; "The John, 2.0"; Popular Science; bearing a date of May 18, 2009; pp. 1-2; located at http://www.popsci.com/scitech/article/2009-05/john-20; printed on Jul. 1, 2009.

Frucci, Adam; "SNIF Dog Tags Track What Your Dog Does All Day; Spoiler: Eat, Sleep, Poop"; gizmodo.com; bearing a date of Jun. 10, 2009; pp. 1-2; located at http://i.gizmodo.com/5286076/snif-dog-tags-track-what-your-dog-does-all-day-spoiler-eat-sl...; printed on Jul. 1, 2009.

Gross, Daniel; "A Jewish Mother in Your Cell Phone"; Slate; bearing a date of Nov. 10, 2009; pp. 1-3; located at http://www.slate.com/formatdynamics/CleanPrintProxy.aspx?125919...; printed on Nov. 25, 2009.

"hacklab.Toilet—a twitter-enabled toilet at hacklab.to"; aculei.net; bearing a date of May 18, 2009; pp. 1-8; located at http://aculei.net/~shardy/hacklabtoilet/; printed on Jul. 1, 2009.

June, Laura; "Apple patent filing shows off activity monitor for skiers, bikers"; engadget.com; bearing a date of Jun. 11, 2009; pp. 1-8; located at http://www.engadget.com/2009/06/11/apple-patent-filing-shows-off-a...; printed on Jul. 1, 2009.

Kraft, Caleb; "Twittering toilet"; Hack a Day; bearing a date of May 5, 2009; pp. 1-11; located at http://hackaday.com/2009/05/05/twittering-toilet/; printed on Jul. 1, 2009.

"Mobile pollution sensors deployed"; BBC News; bearing a date of Jun. 30, 2009; pp. 1-2; located at http://news.bbc.co.uk/2/hi/science/nature/8126498.stm; printed on Jul. 1, 2009; © BBC MMIX.

Oliver, Sam; "Apple developing activity monitor for skiers, snowboarders, bikers"; AppleInsider; bearing a date of Jun. 11, 2009; pp. 1-6; located at http://www.appleinsider.com/articles/09/06/11/apple_developing_act...; printed on Jul. 1, 2009; AppleInsider© 1997-2008.

Rettner, Rachael; "Cell Phones Allow Everyone to Be a Scientist"; LiveScience; bearing a date of Jun. 4, 2009; pp. 1-3; located at http://www.livescience.com/technology/090604-mobile-sensor.html; printed on Jul. 1, 2009; © Imaginova Corp.

* cited by examiner

102 Events Data Acquisition Module

- 202 Reception Module
  - 204 User Interface Reception Module
  - 206 Network Interface Reception Module

FIG. 2a

104 Hypothesis Selection Module

- 208 Reported Event Referencing Module
- 210 Comparison Module
  - 212 Matching Module
  - 214 Contrasting Module
  - 216 Relationship Determination Module
    - 218 Sequential link Determination Module
    - 220 Spatial link Determination Module

FIG. 2b

HYPOTHESIS SELECTION AND PRESENTATION OF ONE OR MORE ADVISORIES

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/313,659, entitled CORRELATING SUBJECTIVE USER STATES WITH OBJECTIVE OCCURRENCES ASSOCIATED WITH A USER, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 21 Nov. 2008, now U.S. Pat. No. 8,046,455 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/315,083, entitled CORRELATING SUBJECTIVE USER STATES WITH OBJECTIVE OCCURRENCES ASSOCIATED WITH A USER, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 26 Nov. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/319,135, entitled CORRELATING DATA INDICATING AT LEAST ONE SUBJECTIVE USER STATE WITH DATA INDICATING AT LEAST ONE OBJECTIVE OCCURRENCE ASSOCIATED WITH A USER, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 31 Dec. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/319,134, entitled CORRELATING DATA INDICATING AT LEAST ONE SUBJECTIVE USER STATE WITH DATA INDICATING AT LEAST ONE OBJECTIVE OCCURRENCE ASSOCIATED WITH A USER, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 31 Dec. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/378,162, entitled SOLICITING DATA INDICATING AT LEAST ONE OBJECTIVE OCCURRENCE IN RESPONSE TO ACQUISITION OF DATA INDICATING AT LEAST ONE SUBJECTIVE USER STATE, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 9 Feb. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/378,288, entitled SOLICITING DATA INDICATING AT LEAST ONE OBJECTIVE OCCURRENCE IN RESPONSE TO ACQUISITION OF DATA INDICATING AT LEAST ONE SUBJECTIVE USER STATE, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 11 Feb. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/380,409, entitled SOLICITING DATA INDICATING AT LEAST ONE SUBJECTIVE USER STATE IN RESPONSE TO ACQUISITION OF DATA INDICATING AT LEAST ONE OBJECTIVE OCCURRENCE, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 25 Feb. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/380,573, entitled SOLICITING DATA INDICATING AT LEAST ONE SUBJECTIVE USER STATE IN RESPONSE TO ACQUISITION OF DATA INDICATING AT LEAST ONE OBJECTIVE OCCURRENCE, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 26 Feb. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/383,581, entitled CORRELATING DATA INDICATING SUBJECTIVE USER STATES ASSOCIATED WITH MULTIPLE USERS WITH DATA INDICATING OBJECTIVE OCCURRENCES, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 24 Mar. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/383,817, entitled CORRELATING DATA INDICATING SUBJECTIVE USER STATES ASSOCIATED WITH MULTIPLE USERS WITH DATA INDICATING OBJECTIVE OCCURRENCES, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 25 Mar. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/384,660, entitled HYPOTHESIS BASED SOLICITATION OF DATA INDICATING AT LEAST ONE SUBJECTIVE USER STATE, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 6 Apr. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/384,779, entitled HYPOTHESIS BASED SOLICITATION OF DATA INDICATING AT LEAST ONE SUBJECTIVE USER STATE, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 7 Apr. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/387,487, entitled HYPOTHESIS BASED SOLICITATION OF DATA INDICATING AT LEAST ONE OBJECTIVE OCCURRENCE, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 30 Apr. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/387,465, entitled HYPOTHESIS BASED SOLICITATION OF DATA INDICATING AT LEAST ONE OBJECTIVE OCCURRENCE, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 30 Apr. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/455,309, entitled HYPOTHESIS DEVELOPMENT BASED ON SELECTIVE REPORTED EVENTS, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 28 May 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/455,317, entitled HYPOTHESIS DEVELOPMENT BASED ON SELECTIVE REPORTED EVENTS, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 29 May 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

A computationally implemented method includes, but is not limited to selecting at least one hypothesis from a plurality of hypotheses relevant to a user, the selection of the at least one hypothesis being based, at least in part, on at least one reported event associated with the user; and presenting one or more advisories related to the hypothesis. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A computationally implemented system includes, but is not limited to: means for selecting at least one hypothesis from a plurality of hypotheses relevant to a user, the selection of the at least one hypothesis being based, at least in part, on at least one reported event associated with the user; and means for presenting one or more advisories related to the hypothesis. In addition to the foregoing, other system aspects are described in the claims, drawings, and text forming a part of the present disclosure.

A computationally implemented system includes, but is not limited to: circuitry for selecting at least one hypothesis from a plurality of hypotheses relevant to a user, the selection of the at least one hypothesis being based, at least in part, on at least one reported event associated with the user; and circuitry for presenting one or more advisories related to the hypothesis. In addition to the foregoing, other system aspects are described in the claims, drawings, and text forming a part of the present disclosure.

A computer program product including a signal-bearing medium bearing one or more instructions selecting at least one hypothesis from a plurality of hypotheses relevant to a user, the selection of the at least one hypothesis being based, at least in part, on at least one reported event associated with the user; and one or more instructions for presenting one or more advisories related to the hypothesis. In addition to the foregoing, other computer program product aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 2a shows another perspective of the events data acquisition module 102 of the computing device 10 of FIG. 1b.

FIG. 2b shows another perspective of the hypothesis selection module 104 of the computing device 10 of FIG. 1b.

DETAILED DESCRIPTION

Figure 1A:
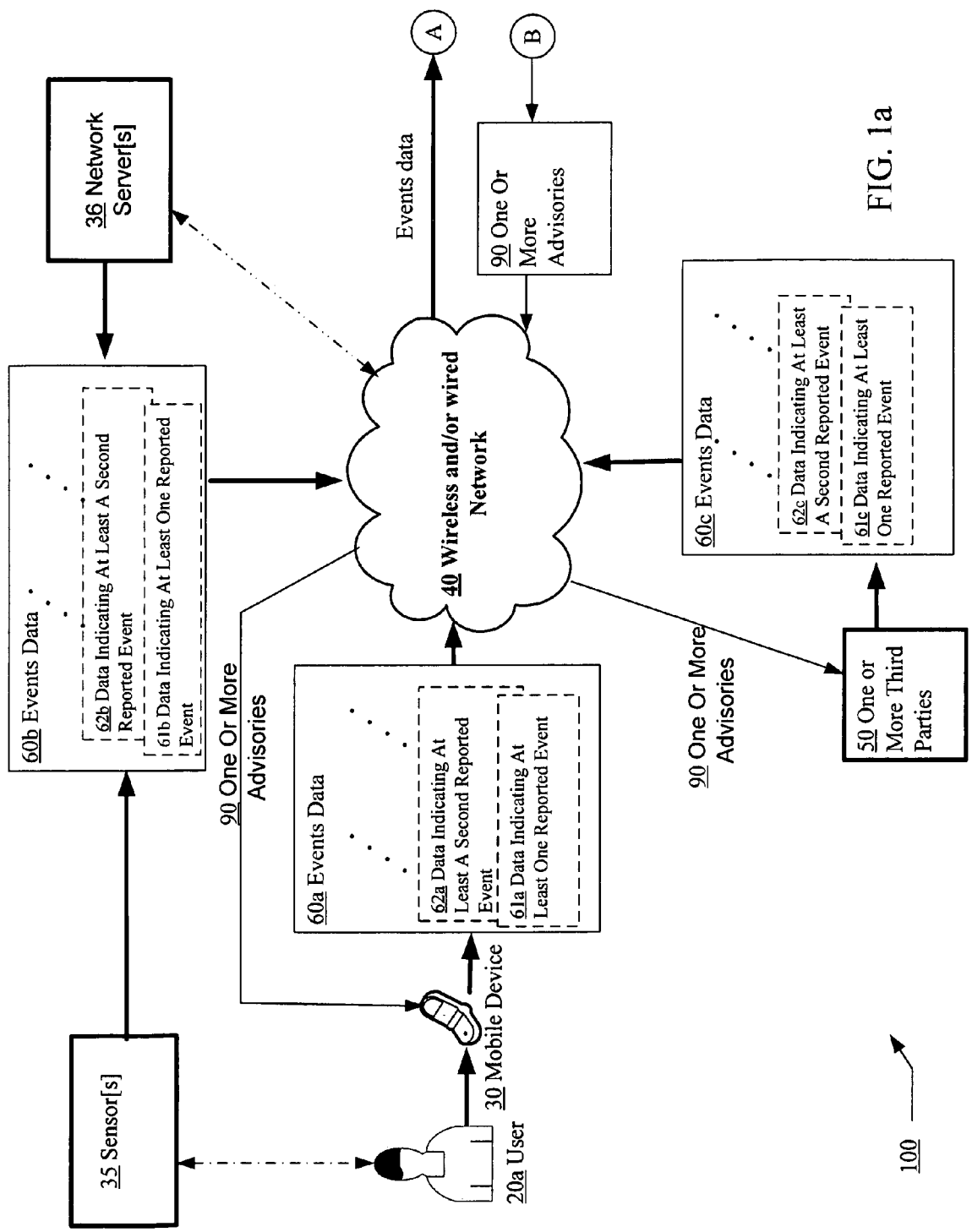
FIGS. 1a and 1b show a high-level block diagram a computing device 10 operating in a network environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

A recent trend that is becoming increasingly popular in the computing/communication field is to electronically record one's feelings, thoughts, and other aspects of the person's everyday life onto an open diary. One place where such open diaries are maintained are at social networking sites commonly known as "blogs" where users may report or post their latest status, personal activities, and various other aspects of the users' everyday life. The process of reporting or posting blog entries is commonly referred to as blogging. Other social networking sites may allow users to update their personal information via, for example, social networking status reports in which a user may report or post for others to view their current status, activities, and/or other aspects of the user.

A more recent development in social networking is the introduction and explosive growth of microblogs in which individuals or users (referred to as "microbloggers") maintain open diaries at microblog websites (e.g., otherwise known as "twitters") by continuously or semi-continuously posting microblog entries. A microblog entry (e.g., "tweet") is typically a short text message that is usually not more than 140 characters long. The microblog entries posted by a microblogger may report on any aspect of the microblogger's daily life. Typically, such microblog entries will describe the various "events" associated with or are of interest to the microblogger that occurs during a course of a typical day. The microblog entries are often continuously posted during the course of a typical day, and thus, by the end of a normal day, a substantial number of events may have been reported and posted.

Each of the reported events that may be posted through microblog entries may be categorized into one of at least three possible categories. The first category of events that may be reported through microblog entries are "objective occurrences" that may or may not be associated with the microblogger. Objective occurrences that are associated with a microblogger may be any characteristic, incident, happening, or any other event that occurs with respect to the microblogger or are of interest to the microblogger that can be objectively reported by the microblogger, a third party, or by a device. Such events would include, for example, intake of food, medicine, or nutraceutical, certain physical characteristics of the microblogger such as blood sugar level or blood pressure that can be objectively measured, activities of the microblogger observable by others or by a device, activities of others that may or may not be of interest to the microblogger, external events such as performance of the stock market (which the microblogger may have an interest in), performance of a favorite sports team, and so forth. In some cases, objective occurrences may not be at least directly associated with a microblogger. Examples of such objective occurrences include, for example, external events that may not be directly related to the microblogger such as the local weather, activities of others (e.g., spouse or boss) that may directly or indirectly affect the microblogger, and so forth.

A second category of events that may be reported or posted through microblog entries include "subjective user states" of the microblogger. Subjective user states of a microblogger may include any subjective state or status associated with the microblogger that can only be typically reported by the microblogger (e.g., generally cannot be directly reported by a third party or by a device). Such states including, for example, the subjective mental state of the microblogger (e.g., happiness, sadness, anger, tension, state of alertness, state of mental fatigue, jealousy, envy, and so forth), the subjective physical state of the microblogger (e.g., upset stomach, state of vision, state of hearing, pain, and so forth), and the subjective overall state of the microblogger (e.g., "good," "bad," state of overall wellness, overall fatigue, and so forth). Note that the term "subjective overall state" as will be used herein refers to those subjective states that may not fit neatly into the other two categories of subjective user states described above (e.g., subjective mental states and subjective physical states).

A third category of events that may be reported or posted through microblog entries include "subjective observations" made by the microblogger. A subjective observation is similar to subjective user states and may be any subjective opinion, thought, or evaluation relating to any external incidence. Thus, the difference between subjective user states and subjective observations is that subjective user states relates to self-described subjective descriptions of the user states of one's self while subjective observations relates to subjective descriptions or opinions regarding external events. Examples of subjective observations include, for example, a microblogger's perception about the subjective user state of another person (e.g., "he seems tired"), a microblogger's perception about another person's activities (e.g., "he drank too much yesterday"), a microblogger's perception about an external event (e.g., "it was a nice day today"), and so forth. Although microblogs are being used to provide a wealth of personal information, thus far they have been primarily limited to their use as a means for providing commentaries and for maintaining open diaries.

In accordance with various embodiments, methods, systems, and computer program products are provided to, among other things, select a hypothesis from a plurality of hypotheses based on at least one reported event associated with a user, the selected hypothesis being a hypothesis that may link together (e.g., correlate) a plurality of different types of events (i.e., event types). In some embodiments, the selected hypothesis (as well as, in some cases, the plurality of hypotheses) may be relevant to the user. After making the selection, the methods, systems, and computer program products may present one or more advisories related to the selected hypothesis. The methods, systems, and computer program products may be employed in a variety of environments including, for example, social networking environments, blogging or microblogging environments, instant messaging (IM) environments, or any other type of environment that allows a user to, for example, maintain a diary.

In various implementations, a "hypothesis," as referred to herein, may define one or more relationships or links between different types of events (i.e., event types) including at least a first event type (e.g., a type of event such as a particular type of subjective user state, for example, an emotional state such as "happy") and a second event type (e.g., another type of event such as particular type of objective occurrence, for example, favorite sports team winning a game). In some cases, a hypothesis may be represented by an events pattern that may indicate spatial or sequential relationships between different event types (e.g., different types of events such as subjective user states and objective occurrences). Note that for ease of explanation and illustration, the following description will describe a hypothesis as defining, for example, the sequential or spatial relationship between two different event types, a first event type and a second event type. However, those skilled in the art will recognize that such a hypothesis could also identify the relationships between three or more event types (e.g., a first event type, a second event type, a third event type, and so forth).

In some embodiments, a hypothesis may, at least in part, be defined or represented by an events pattern that indicates or suggests a spatial or a sequential (e.g., time/temporal) relationship between different event types. Such a hypothesis, in some cases, may also indicate the strength or weakness of the link between the different event types. That is, the strength or weakness (e.g., soundness) of the correlation between different event types may depend upon, for example, whether the events pattern repeatedly occurs and/or whether a contrasting events pattern has occurred that may contradict the hypothesis and therefore, weaken the hypothesis (e.g., an events pattern that indicates a person becoming tired after jogging for thirty minutes when a hypothesis suggests that a person will be energized after jogging for thirty minutes).

As briefly described above, a hypothesis may be represented by an events pattern that may indicate spatial or sequential (e.g., time or temporal) relationship or relationships between multiple event types. In some implementations, a hypothesis may merely indicate temporal sequential relationships between multiple event types that indicate the temporal relationships between multiple event types. In alternative implementations a hypothesis may indicate a more specific time relationship between multiple event types. For example, a sequential pattern may represent the specific pattern of events that occurs along a timeline that may indicate the specific time intervals between event types. In still other implementations, a hypothesis may indicate the spatial (e.g., geographical) relationships between multiple event types.

In various embodiments, the development of a hypothesis may be particularly useful to a user (e.g., a microblogger or a social networking user) that the hypothesis may be associated with. That is, in some instances a hypothesis may be developed for a user that may assist the user in modifying his/her future behavior, while in other instances such a hypothesis may simply alert or notify the user that a pattern of events are repeatedly occurring. In other situations, such a hypothesis may be useful to third parties such as advertisers in order to assist the advertisers in developing a more targeted marketing scheme. In still other situations, such a hypothesis may help in the treatment of ailments associated with the user.

One way to develop a hypothesis (e.g., creation of and/or further development of a hypothesis) is to determine a pattern of reported events that repeatedly occurs with respect to a particular user and/or to compare similar or dissimilar reported pattern of events that occurs with respect to a user. For example, if a user such as a microblogger reports repeatedly that after each visit to a particular restaurant, the user always has an upset stomach, then a hypothesis may be created and developed that suggests that the user will get an upset stomach after visiting the particular restaurant. If, on the other hand, after developing such a hypothesis, the user reports that the last time he ate at the restaurant, he did not get an upset stomach, then such a report may result in the weakening of the hypothesis. Alternatively, if after developing such a hypothesis, the user reports that the last time he ate at the restaurant, he again got an upset stomach, then such a report may result in a confirmation of the soundness of the hypothesis. Note that the soundness of a hypothesis (e.g., strength or weakness of the hypothesis) may depend upon how much the historical data supports such a hypothesis.

Numerous hypotheses may be developed and may be associated with a particular user. For example, in the case of a microblogger, given the amount of "events data" (and the large amounts of reported events indicated by the events data) that may be provided by the microblogger via microblog entries, a large number of hypotheses associated with the microblogger may eventually be developed based on the reported events indicated by the events data. Alternatively, hypotheses may also be provided by one or more third party sources. For example, a number of hypotheses may be provided by other users or by one or more network service providers.

Thus, in accordance with various embodiments, methods, systems, and computer program products are provided to, among other things, select a hypothesis from a plurality of hypotheses that may be associated with a particular user (e.g., a microblogger), where the selected hypothesis may link or correlate a plurality of different types of events (i.e., event types). After making the selection, the methods, systems, and computer program products may present one or more advisories related to the selected hypothesis.

Figure 1B:
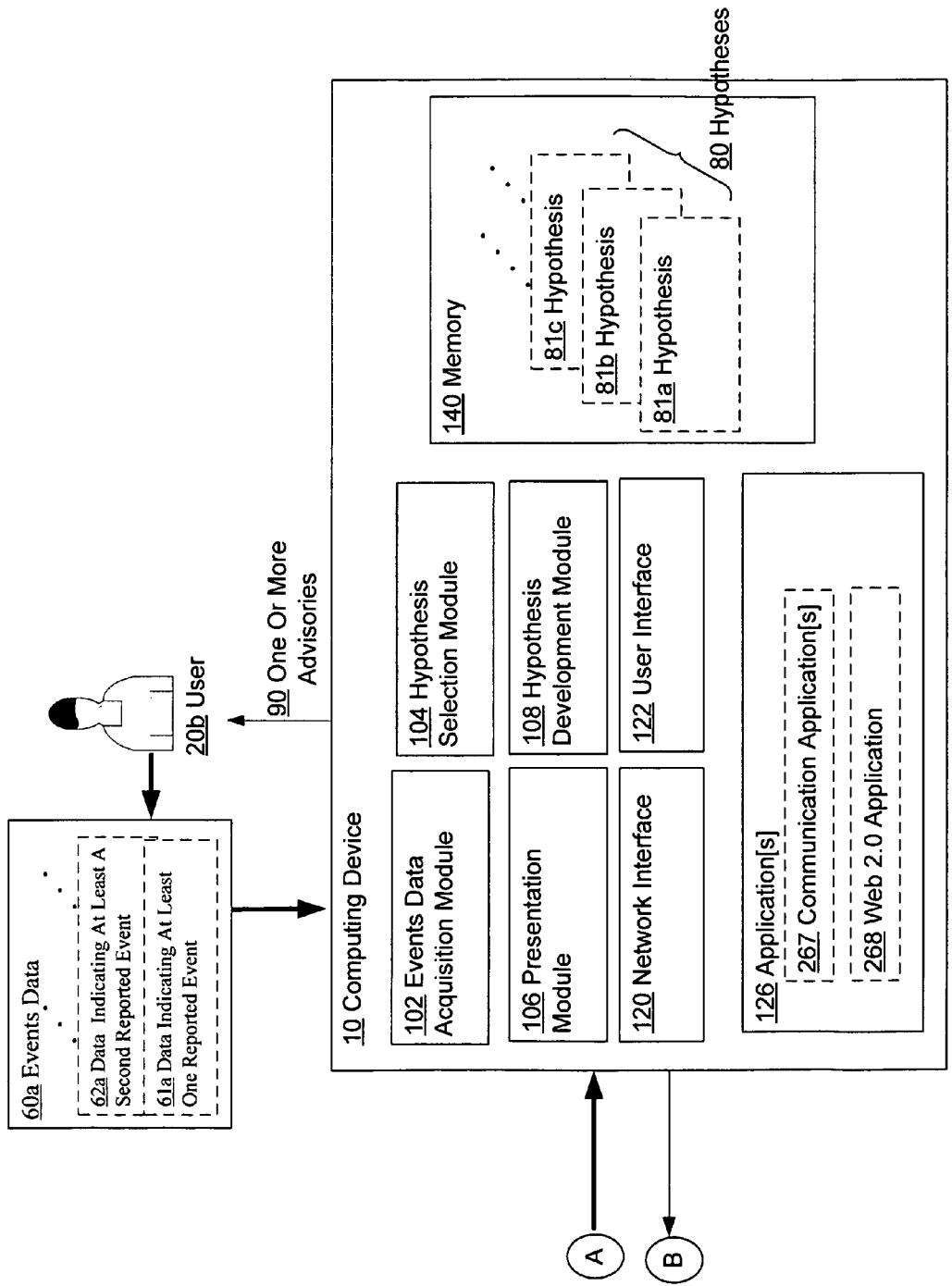

FIGS. 1a and 1b illustrate an example environment in accordance with various embodiments. In the illustrated environment, an exemplary system 100 may include at least a computing device 10 (see FIG. 1b). The computing device 10, which may be a server (e.g., network server) or a standalone device, may be employed in order to, among other things, acquire events data 60* that may indicate one or more reported events. For example, the events data 60* to be acquired may include data indicating at least one reported event 61*, data indicating at least a second reported event 62*, and so forth. Based on the one or more reported events indicated by the acquired events data 60*, the computing device 10 may then be configured to select at least one hypothesis 81* from a plurality of hypotheses 80. After selecting the at least one hypothesis 81*, the computing device 10 may be configured to present one or more advisories 90 related to the at least one hypothesis 81*.

As indicated earlier, in some embodiments, the computing device 10 may be a server while in other embodiments the computing device 10 may be a standalone device. In the case where the computing device 10 is a network server, the computing device 10 may communicate indirectly with a user 20a via wireless and/or wired network 40. In contrast, in embodiments where the computing device 10 is a standalone device, it may communicate directly with a user 20b via a user interface 122 (see FIG. 1b). In the following, "*" indicates a wildcard. Thus, references to user 20* may indicate a user 20a or a user 20b of FIGS. 1a and 1b.

In embodiments in which the computing device 10 is a network server, the computing device 10 may communicate with a user 20a via a mobile device 30 and through a wireless and/or wired network 40. A network server, as will be described herein, may be in reference to a server located at a single network site or located across multiple network sites or a conglomeration of servers located at multiple network sites. The mobile device 30 may be a variety of computing/communication devices including, for example, a cellular phone, a personal digital assistant (PDA), a laptop, a desktop, or other types of computing/communication devices that can communicate with the computing device 10. In some embodiments, the mobile device 30 may be a handheld device such as a cellular telephone, a smartphone, a Mobile Internet Device (MID), an Ultra Mobile Personal Computer (UMPC), a convergent device such as a personal digital assistant (PDA), and so forth.

In embodiments in which the computing device 10 is a standalone computing device 10 (or simply "standalone device") that communicates directly with a user 20b, the computing device 10 may be any type of portable device (e.g., a handheld device) or stationary device (e.g., desktop computer or workstation). For these embodiments, the computing device 10 may be a variety of computing/communication devices including, for example, a cellular phone, a personal digital assistant (PDA), a laptop, a desktop, or other types of computing/communication devices. In some embodiments, in which the computing device 10 is a handheld device, the computing device 10 may be a cellular telephone, a smartphone, an MID, an UMPC, a convergent device such as a PDA, and so forth. In various embodiments, the computing device 10 may be a peer-to-peer network component device. In some embodiments, the computing device 10 and/or the mobile device 30 may operate via a Web 2.0 construct (e.g., Web 2.0 application 268).

In various embodiments, the computing device 10 may be configured to acquire events data 60* from one or more sources. Events data 60*, as will be described herein, may indicate the occurrences of one or more reported events. Each of the reported events indicated by the events data 60* may or may not be associated with a user 20*. In some embodiments, a reported event may be associated with the user 20* if it is reported by the user 20* or it is related to some aspect about the user 20* (e.g., the location of the user 20*, the local weather of the user 20*, activities performed by the user 20*, physical characteristics of the user 20* as detected by a sensor 35, subjective user state of the user 20*, and so forth). At least three different types of reported events may be indicated by the events data 60*, subjective user states associated with a user 20*, objective occurrences, and subjective observations made by the user 20* or by others (e.g., one or more third parties 50).

The events data 60* that may be acquired by the computing device 10 may include at least data indicating at least one reported event 61* and/or data indicating at least a second reported event 62*. Though not depicted, the events data 60* may further include data indicating incidences of a third reported event, a fourth reported event, and so forth (as indicated by the dots). The events data 60* including the data indicating at least one reported event 61* and/or the data indicating at least a second reported event 62* may be obtained from one or more distinct sources (e.g., the original sources for the data). For example, in some implementations, a user 20* may provide at least a portion of the events data 60* (e.g., events data 60a that may include the data indicating at least one reported event 61a and/or the data indicating at least a second reported event 62a).

In the same or different embodiments, one or more remote network devices including one or more sensors 35 and/or one or more network servers 36 may provide at least a portion of the events data 60* (e.g., events data 60b that may include the data indicating at least one reported event 61b and/or the data indicating at least a second reported event 62b). In same or different embodiments, one or more third party sources may provide at least a portion of the events data 60* (e.g., events data 60c that may include the data indicating at least one reported event 61c and/or the data indicating at least a second reported event 62c). In still other embodiments, at least a portion of the events data 60* may be retrieved from a memory 140 in the form of historical data. Thus, to summarize, each of the data indicating at least one reported event 61* and the data indicating at least a second reported event 62* may be obtained from the same or different sources.

The one or more sensors 35 illustrated in FIG. 1a may represent a wide range of devices that can monitor various aspects or events associated with a user 20a (or user 20b). For example, in some implementations, the one or more sensors 35 may include devices that can monitor the user's physiological characteristics such as blood pressure sensors, heart rate monitors, glucometers, and so forth. In some implementations, the one or more sensors 35 may include devices that can monitor activities of a user 20* such as a pedometer, a toilet monitoring system (e.g., to monitor bowel movements), exercise machine sensors, an accelerometer to measure a person's movements which may indicate specific activities, and so forth. The one or more sensors 35 may also include other types of sensor/monitoring devices such as video or digital camera, global positioning system (GPS) to provide data that may be related to a user 20* (e.g., locations of the user 20*), and so forth.

The one or more third parties 50 illustrated in FIG. 1a may represent a wide range of third parties and/or the network devices associated with such parties. Examples of third parties include, for example, other users (e.g., other microbloggers or other social networking site users), health care entities (e.g., dental or medical clinic, hospital, physician's office, medical lab, and so forth), content providers, businesses such as retail business, employers, athletic or social groups, educational entities such as colleges and universities, and so forth.

In brief, after acquiring the events data 60* including data indicating at least one reported event 61* and/or data indicating at least a second reported event 62* from one or more sources, the computing device 10 may be designed to select at least one hypothesis 81* from a plurality of hypotheses 80 based, at least in part, on at least one reported event associated with a user 20*. In some cases, the selected hypothesis 81* as well as the plurality of hypotheses 80 may be relevant to the user 20*. In various embodiments, each of the plurality of hypotheses 80 may have been created and/or may have been at least initially provided (e.g., pre-installed) by a third party (e.g., network service providers, computing device manufacturer, and so forth) and/or may have been further refined by the computing device 10.

After selecting the at least one hypothesis 81*, the computing device 10 may be designed to execute one or more actions. One such action that may be executed is to present one or more advisories 90 associated with the at least one hypothesis 81* that was selected. For example, the computing device 10 may present the one or more advisories 90 to a user 20* (e.g., by transmitting the one or more advisories 90 to a user 20a or indicating the one or more advisories 90 to a user 20b via a user interface 122), to one or more third parties 50, and/or to one or more remote network devices (e.g., network servers 36). The one or more advisories 90 to be presented may include at least a presentation of the selected hypothesis 81*, an alert regarding past events related to the hypothesis 81* (e.g., past events that the hypothesis 81* may have been based on), a recommendation for a future action based on the selected hypothesis 81*, a prediction of an occurrence of a future event based on the selected hypothesis 81*, or other types of advisories.

As illustrated in FIG. 1b, computing device 10 may include one or more components and/or sub-modules. As those skilled in the art will recognize, these components and sub-modules may be implemented by employing hardware (e.g., in the form of circuitry such as application specific integrated circuit or ASIC, field programmable gate array or FPGA, or other types of circuitry), software, a combination of both hardware and software, or a general purpose computing device executing instructions included in a signal-bearing medium. In various embodiments, computing device 10 may include an events data acquisition module 102, a hypothesis selection module 104, a presentation module 106, a hypothesis development module 108, a network interface 120 (e.g., network interface card or NIC), a user interface 122 (e.g., a display monitor, a touchscreen, a keypad or keyboard, a mouse, an audio system including a microphone and/or speakers, an image capturing system including digital and/or video camera, and/or other types of interface devices), one or more applications 126 (e.g., a web 2.0 application 268, one or more communication applications 267 including, for example, a voice recognition application, and/or other applications), and/or memory 140, which may include a plurality of hypothesis 80. Note that although not depicted, one or more copies of the one or more applications 126 may be included in memory 140.

The events data acquisition module 102 may be configured to, among other things, acquire events data 60* from one or more distinct sources (e.g., from a user 20*, from one or more third parties 50, from one or more network devices such as one or more sensors 35 and/or one or more network servers 36, from memory 140 and/or from other sources). The events data 60* to be acquired by the events data acquisition module 102 may include one, or both, of data indicating at least one reported event 61* and data indicating at least a second reported event 62*. Each of the data indicating at least one reported event 61* and the data indicating at least a second reported event 62* may be acquired from the same source or different sources. The events data acquisition module 102 may also be designed to acquire additional data indicating a third reported event, a fourth reported event, and so forth. The events data 60* may be acquired in the form of one or more electronic entries such as blog (e.g., microblog) entries, status report entries, electronic message entries, diary entries, and so forth.

Referring now to FIG. 2a illustrating particular implementations of the events data acquisition module 102 of the computing device 10 of FIG. 1b. The events data acquisition module 102 may include a reception module 202 for receiving events data 60* including at least one of the data indicating at least one reported event 61* and the data indicating at least a second reported event 62*. The reception module 202 may further include a user interface reception module 204 and/or a network interface reception module 206. The user interface reception module 204 may be configured to receive, via a user interface 122, the events data 60* including at least one of the data indicating at least one reported event 61* and the data indicating at least a second reported event 62*. In contrast, the network interface reception module 206 may be configured to receive (e.g., via network interface 120) from a wireless and/or wired network 40 the events data 60* including at least one of the data indicating at least one reported event 61* and the data indicating at least a second reported event 62*. The reception module 202 may be designed to receive the events data 60* including the data indicating at least one reported event 61* and/or the data indicating at least a second reported event 62* in various forms and from various sources. For example, the events data 60* may be in the form of electronic entries such as blog entries (e.g., microblog entries), status report entries, and electronic messages. In various implementations, such entries may have originated from a user 20*, one or more third parties 50*, or one or more remote network devices (e.g., sensors 35 or network servers 36).

The hypothesis selection module 104 of the computing device 10 of FIG. 1b may be configured to, among other things, select a hypothesis 81* from a plurality of hypotheses 80 that may be relevant to a user 20*, the selection of the hypothesis 81* being based, at least in part, on at least one reported event associated with the user 20* (e.g., at least one reported event that is about or related to the user 20*, that may have been reported by the user 20*, or that may be of interest to the user 20*). FIG. 2b illustrates particular implementations of the hypothesis selection module 104 of FIG. 1b. As illustrated, the hypothesis selection module 104 may include a reported event referencing module 208 and/or a comparison module 210 that may further include a matching module 212, a contrasting module 214, and/or a relationship determination module 216 (that may further include a sequential link determination module 218 and/or a spatial link determination module 220). In various implementations, these sub-modules may be employed in order to facilitate the hypothesis selection module 104 in selecting the at least one hypothesis 81*.

In brief, the reported event referencing module 208 may be designed to reference one or more reported events that may have been indicated by the events data 60* acquired by the events data acquisition module 102. The referencing of the one or more reported events may facilitate the hypothesis selection module 104 in the selection of the at least one hypothesis 81*. In contrast, the comparison module 210 may be configured to compare the at least one reported event (e.g., as referenced by the reported event referencing module 208) to one, or both, of at least a first event type and a second event type that may be linked together by the at least one hypothesis 81*.

The matching module 212 may be configured to determine whether the at least one reported event at least substantially matches with the first event type and/or the second event type that may be indicated by the at least one hypothesis 81*. On the other hand, the contrasting module 214 may be configured to determine whether a second reported event (e.g., as indicated by the acquired events data 60*) is a contrasting event from the at least first event type and/or the second event type that may be indicated by the at least one hypothesis 81*.

The relationship determination module 216 may be configured to determine a relationship between a first reported event and a second reported event (e.g., as indicated by the acquired events data 60*). The sequential link determination module 218 may facilitate the relationship determination module 216 to determine a relationship between the first reported event and the second reported event by determining a sequential link (e.g., a temporal or a more specific time relationship) between the first reported event and the second reported event. The spatial link determination module 220 may facilitate the relationship determination module 216 to determine a relationship between the first reported event and the second reported event by determining a spatial link (e.g., a geographical relationship) between the first reported event and the second reported event.

Figure 2C:
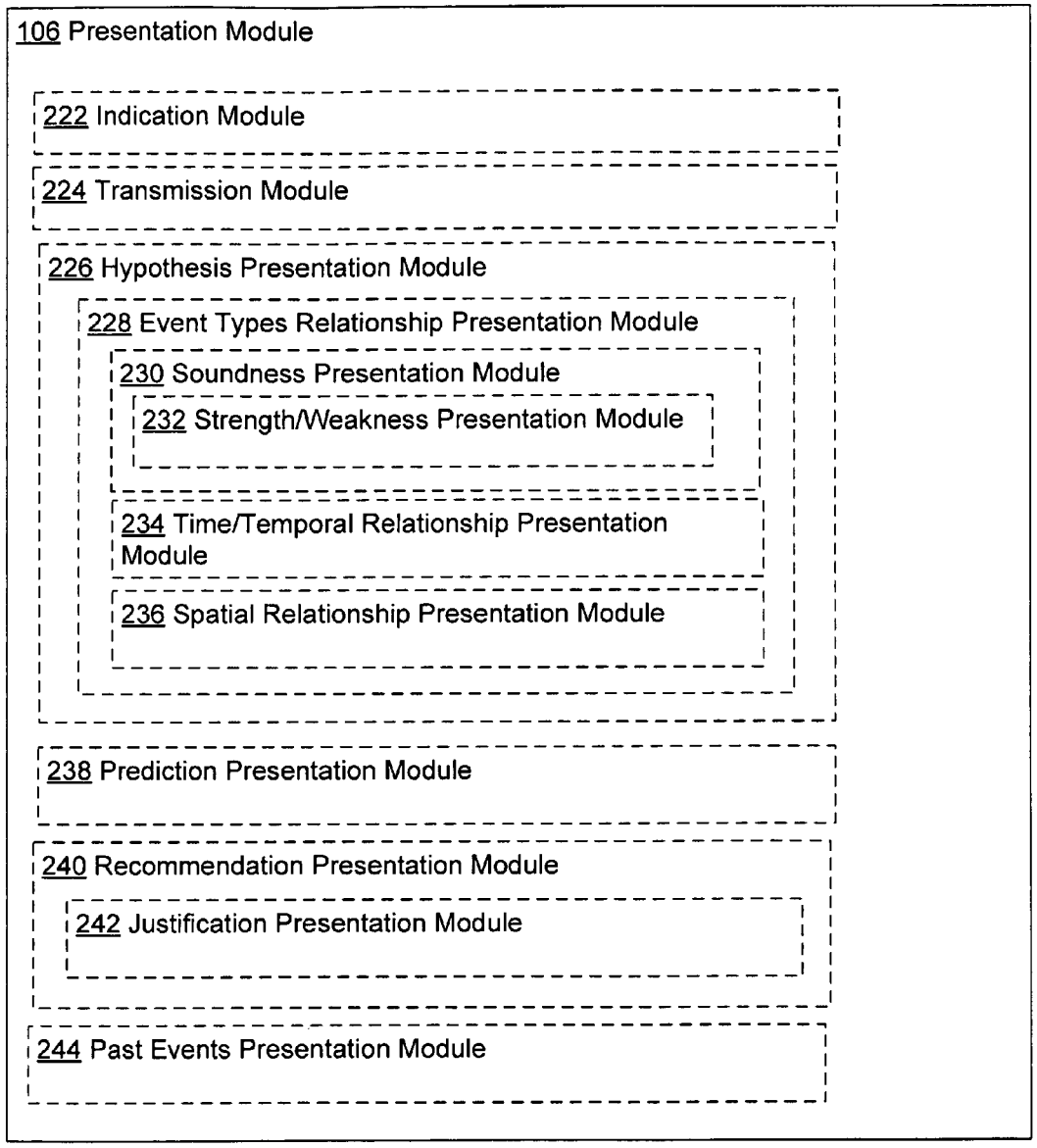
FIG. 2c shows another perspective of the presentation module 106 of the computing device 10 of FIG. 1b.

FIG. 2c illustrates particular implementations of the presentation module 106 of FIG. 1b. In various implementations, the presentation module 106 may be configured to, among other things, present one or more advisories 90 related to the at least one hypothesis 81* selected by the hypothesis selection module 104. The presentation module 106, in various implementations, may include one or more sub-modules that may facilitate the presentation of the one or more advisories 90. For example, and as illustrated, the presentation module 106 may include an indication module 222 configured to indicate one or more advisories 90 related to the at least one hypothesis 81* selected by the hypothesis selection module 104. The presentation module 106 may also include a transmission module 224 configured to transmit one or more advisories 90 related to the at least one hypothesis 81* selected by the hypothesis selection module 104 via, for example, at least one of a wireless network or a wired network 40.

In various implementations, the presentation module 106 may include a hypothesis presentation module 226 configured to present (e.g., transmit via a wireless and/or wired network 40 or indicate via a user interface 122) at least one form of the at least one hypothesis 81* selected by the hypothesis selection module 104. The at least one hypothesis 81* may be presented in a number of different formats. For example, the hypothesis 81* may be presented in a graphical or iconic form, in audio form, or in textual form. Further, with respect to presenting the at least one hypothesis 81* in textual form, the hypothesis 81* may be presented in many different ways as there may be many different ways to describe a hypothesis 81* (this is also true when the hypothesis 81* is presented graphically or audioally). The hypothesis presentation module 226, in various implementations, may further include an event types relationship presentation module 228 that is configured to present an indication of a relationship (e.g., spatial or sequential relationship) between at least a first event type and at least a second event type as referenced by the at least one hypothesis 81* selected by the hypothesis selection module 104.

In various implementations, the event types relationship presentation module 228 may further include a soundness presentation module 230 configured to present an indication of the soundness of the at least hypothesis 81* selected by the hypothesis selection module 104. In some implementations, the soundness presentation module 230 may further include a strength/weakness presentation module 232 configured to present an indication of strength or weakness of correlation between the at least first event type and the at least second event type that may be linked together by the at least one hypothesis 81*, the at least one hypothesis 81* being selected by the hypothesis selection module 104.

The event types relationship presentation module 228, in various alternative implementations, may include a time/temporal relationship presentation module 234 that is configured to present an indication of a time or temporal relationship between the at least first event type and the at least second event type linked together by the at least one hypothesis 81*. In some implementations, the event types relationship presentation module 228 may be configured to present an indication of a spatial relationship between the at least first event type and the at least second event type linked together by the at least one hypothesis 81*.

In some implementations, the presentation module 106 may include a prediction presentation module 238 that is configured to present (e.g., transmit via a wireless and/or wired network 40 or indicate via a user interface 122) an advisory relating to a prediction of a future event. Such an advisory may be based on the at least one hypothesis 81* selected by the hypothesis selection module 104. For example, suppose the at least one hypothesis 81* suggests that there is a link between jogging and sore ankles, then upon the events data acquisition module 102 acquiring data indicating that a user 20* went jogging, then the predication presentation module 238 may present an indication that the user 20* will subsequently have sore ankles.

In the same or different implementations, the presentation module 106 may include a recommendation presentation module 240 that may be configured to present (e.g., transmit via a wireless and/or wired network 40 or indicate via a user interface 122) a recommendation for a future course of action. Such a recommendation may be based, at least in part, on the at least one hypothesis 81* selected by the hypothesis selection module 104. For example, referring back to the above jogging/sore ankle example, the recommendation presentation module 240 may recommend that the user 20* ingest aspirin.

In some implementations, the recommendation presentation module 240 may include a justification presentation module 242 that may be configured to present a justification for the recommendation presented by the recommendation presentation module 240. For example, in the above jogging/sore ankle example, the justification presentation module 242 may present an indication that the user 20* should ingest the aspirin because her ankles will be sore as a result of jogging.

In various alternative implementations, the presentation module 106 may include a past events presentation module 244 that may be configured to present (e.g., transmit via a wireless and/or wired network 40 or indicate via a user interface 122) an indication of one or more past events. Such a presentation of past events may be based, at least in part, on the at least one hypothesis 81* selected by the hypothesis selection module 104. For example, in the above jogging/sore ankle example, the past events presentation module 244 may be designed to present an indication that the user 20* in the past seems to always have sore ankles after going jogging.

In various implementations, the computing device 10 may include a hypothesis development module 108 that may be configured to develop one or more hypothesis 81* (e.g., create new hypotheses or to further refine hypotheses). In various implementations, the development of a hypothesis 81* may be based, at least in part, on events data 60* that indicate one or more reported events. In some cases, the development of a hypothesis 81* may be further based on historical data such as historical medical data, population data, past user data (e.g., past user data indicating past reported events associated with a user 20*), and so forth.

In various implementations, the computing device 10 of FIG. 1b may include one or more applications 126. The one or more applications 126 may include, for example, one or more communication applications 267 (e.g., text messaging application, instant messaging application, email application, voice recognition system, and so forth) and/or Web 2.0 application 268 to facilitate in communicating via, for example, the World Wide Web. In some implementations, copies of the one or more applications 126 may be stored in memory 140.

In various implementations, the computing device 10 may include a network interface 120, which may be a device designed to interface with a wireless and/or wired network 40. Examples of such devices include, for example, a network interface card (NIC) or other interface devices or systems for communicating through at least one of a wireless network or wired network 40. In some implementations, the computing device 10 may include a user interface 122. The user interface 122 may comprise any device that may interface with a user 20b. Examples of such devices include, for example, a keyboard, a display monitor, a touchscreen, a microphone, a speaker, an image capturing device such as a digital or video camera, a mouse, and so forth.

The computing device 10 may include a memory 140. The memory 140 may include any type of volatile and/or non-volatile devices used to store data. In various implementations, the memory 140 may include, for example, a mass storage device, read only memory (ROM), programmable read only memory (PROM), erasable programmable read-only memory (EPROM), random access memory (RAM), flash memory, synchronous random access memory (SRAM), dynamic random access memory (DRAM), and/or other memory devices. In various implementations, the memory 140 may store a plurality of hypotheses 80.

The various features and characteristics of the components, modules, and sub-modules of the computing device 10 presented thus far will be described in greater detail with respect to the processes and operations to be described herein.

Figure 3:
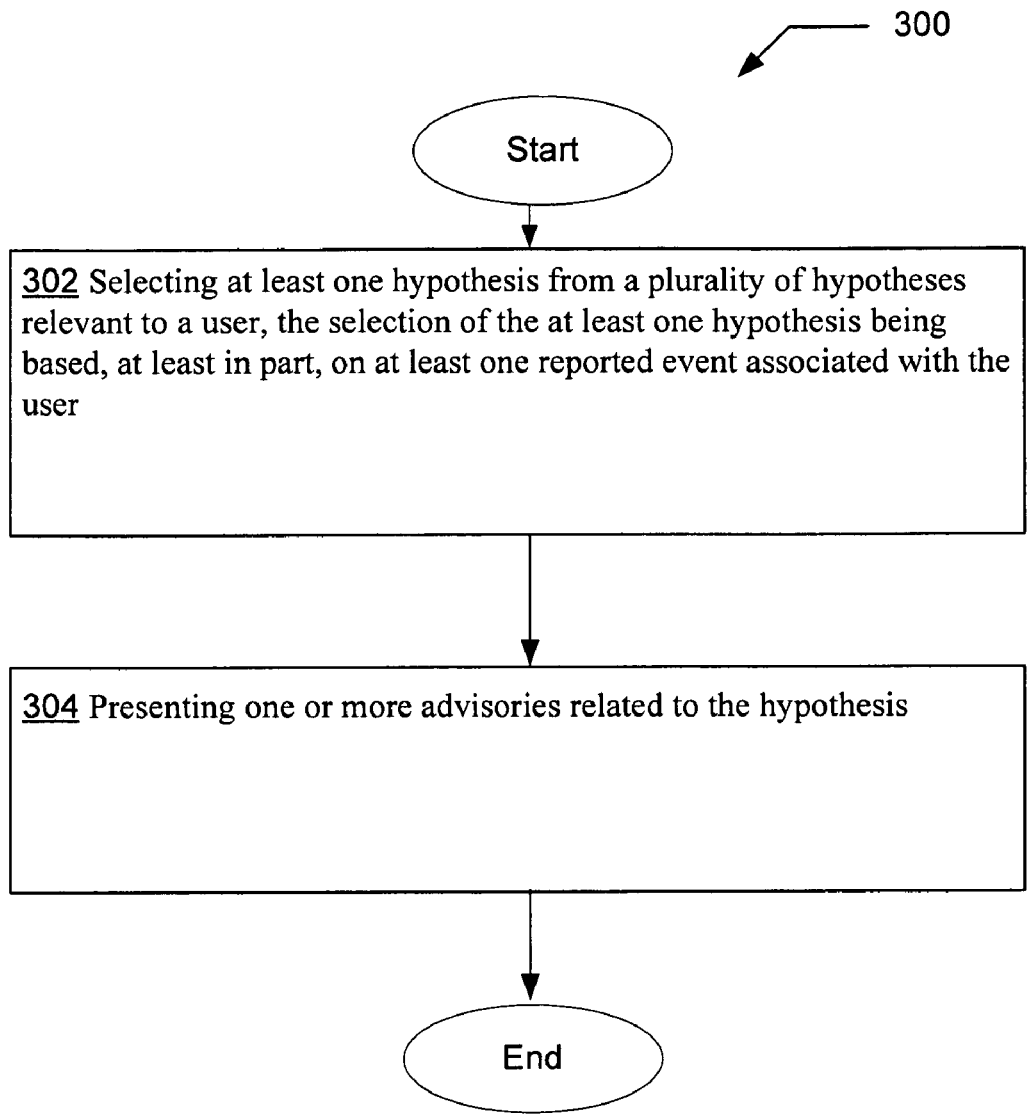
FIG. 3 is a high-level logic flowchart of a process.

FIG. 3 illustrates an operational flow 300 representing example operations related to, among other things, hypothesis selection from a plurality of hypotheses and presentation of one or more advisories in response to the selection. In some embodiments, the operational flow 300 may be executed by, for example, the computing device 10 of FIG. 1b, which may be a server or a standalone device.

In FIG. 3 and in the following figures that include various examples of operational flows, discussions and explanations may be provided with respect to the above-described exemplary environment of FIGS. 1a and 1b, and/or with respect to other examples (e.g., as provided in FIGS. 2a-2c) and contexts. However, it should be understood that the operational flows may be executed in a number of other environments and contexts, and/or in modified versions of FIGS. 1a, 1b, and 2a-2c. Also, although the various operational flows are presented in the sequence(s) illustrated, it should be understood that the various operations may be performed in different sequential orders other than those which are illustrated, or may be performed concurrently.

Further, in the following figures that depict various flow processes, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently.

In any event, after a start operation, the operational flow 300 may move to a hypothesis selection operation 302 for selecting at least one hypothesis from a plurality of hypotheses relevant to a user, the selection of the at least one hypothesis being based, at least in part, on at least one reported event associated with the user. For instance, the hypothesis selection module 104 of the computing device 10 selecting at least one hypothesis 81* (e.g., a hypothesis that correlates or links a first event type with a second event type) from a plurality of hypotheses 80 relevant to a user 20* (e.g., hypotheses 80 that may be specifically relevant to the user 20* or at least to a sub-group of the population that the user 20* belongs to), the selection of the at least one hypothesis 81* being based, at least in part, on at least one reported event associated with the user 20*. Note that in the following description and for ease of illustration and understanding the hypothesis 81* to be selected through the hypothesis selection operation 302 may be described as a hypothesis that links together or associates two types of events (i.e., event types). However, those skilled in the art will recognize that such a hypothesis 81* may actually relate to the linking together of three or more types of events in various alternative implementations.

Next, operational flow 300 may include an advisory presentation operation 304 for presenting one or more advisories related to the hypothesis. For instance, the presentation module 106 of the computing device 10 presenting (e.g., transmitting through a wireless and/or wired network 40, or indicating via a user interface 122) one or more advisories 90 (e.g., an advisory relating to one or more past events, a recommendation for a future action, and so forth) related to the hypothesis 81*.

Figure 4A:
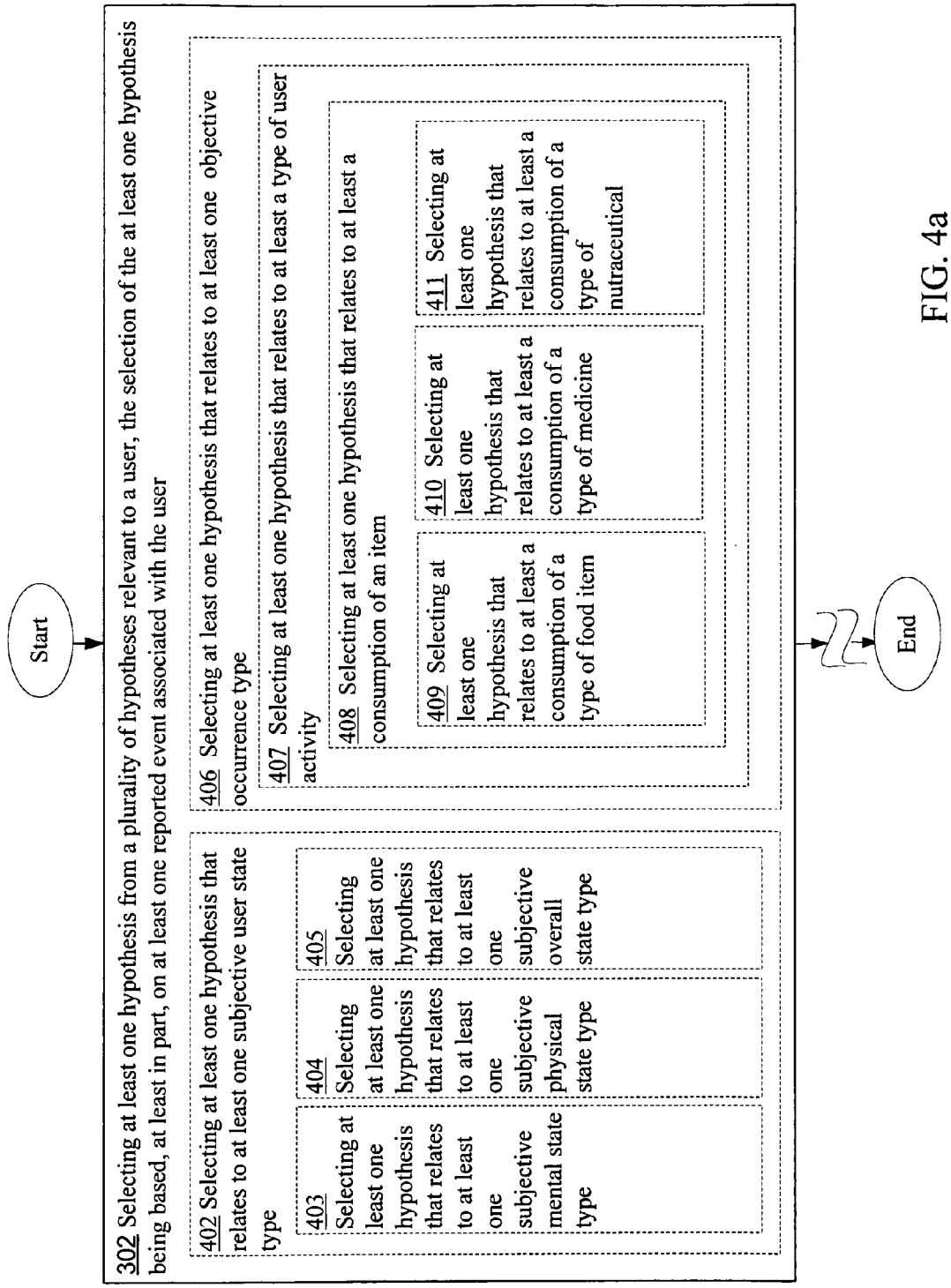
FIG. 4a is a high-level logic flowchart of a process depicting alternate implementations of the hypothesis selection operation 302 of FIG. 3.

The at least one hypothesis 81* to be selected during the hypothesis selection operation 302 of FIG. 3 may be related to one or more types of events (i.e., event types) in various alternative implementations. For example, in some implementations, the hypothesis selection operation 302 may include an operation 402 for selecting at least one hypothesis that relates to at least one subjective user state type as depicted in FIG. 4a. For instance, the hypothesis selection module 104 of the computing device 10 selecting at least one hypothesis 81* that relates to at least one subjective user state type (e.g., a subjective mental state such as anger, a subjective user state such as upset stomach, or a subjective overall state such as "good").

In various implementations, the at least one hypothesis 81* to be selected through operation 402 may be directed to any one or more of a number of different types of subjective user states. For example, in some implementations, operation 402 may include an operation 403 for selecting at least one hypothesis that relates to at least one subjective mental state type as depicted in FIG. 4a. For instance, the hypothesis selection module 104 of the computing device 10 selecting at least one hypothesis 81* that relates to at least one subjective mental state type (e.g., anger, happiness, depression, alertness, nausea, jealousy, mental fatigue, and so forth).

In the same or different implementations, operation 402 may include an operation 404 for selecting at least one hypothesis that relates to at least one subjective physical state type as depicted in FIG. 4a. For instance, the hypothesis selection module 104 of the computing device 10 selecting at least one hypothesis 81* that relates to at least one subjective physical state type (e.g., upset stomach, pain, blurry vision, cramps, and so forth).

In the same or different implementations, operation 402 may include an operation 405 for selecting at least one hypothesis that relates to at least one subjective overall state type as depicted in FIG. 4a. For instance, the hypothesis selection module 104 of the computing device 10 selecting at least one hypothesis 81* that relates to at least one subjective overall state type (e.g., overall wellness, availability, unavailability or occupied, overall fatigue, and so forth).

In various implementations, the at least one hypothesis 81* to be selected through the hypothesis selection operation 302 may be related to at least one type of objective occurrence (i.e., objective occurrence type). For example, in some implementations, the hypothesis selection operation 302 may include an operation 406 for selecting at least one hypothesis that relates to at least one objective occurrence type as depicted in FIG. 4a. For instance, the hypothesis selection module 104 of the computing device 10 selecting at least one hypothesis 81* that relates to at least one objective occurrence type (e.g., user activity, external event, user geographical location, and so forth).

In various implementations, operation 406 may include one or more additional operations. For example, in some implementations, operation 406 may include an operation 407 for selecting at least one hypothesis that relates to at least a type of user activity as depicted in FIG. 4a. For instance, the hypothesis selection module 104 of the computing device 10 selecting at least one hypothesis 81* that relates to at least a type of user activity (e.g., consumption of an edible item, a type of social activity, a type of exercise activity, and so forth).

In some implementations, operation 407 may include an operation 408 for selecting at least one hypothesis that relates to at least a consumption of an item as depicted in FIG. 4a. For instance, the hypothesis selection module 104 of the computing device 10 selecting at least one hypothesis 81* that relates to at least a consumption of an item (e.g., an edible item such as food, herbs, beverages, medicine, nutraceuticals, and so forth).

Operation 408, in turn, may further include one or more operations in various alternative implementations. For example, in some implementations, operation 408 may include an operation 409 for selecting at least one hypothesis that relates to at least a consumption of a type of food item as depicted in FIG. 4a. For instance, the hypothesis selection module 104 of the computing device 10 selecting at least one hypothesis 81* that relates to at least a consumption of a type of food item (e.g., fruits, vegetables, meats, particular dishes, ethnic foods, alcoholic beverages, coffee, and so forth).

In the same or different implementations, operation 408 may include an operation 410 for selecting at least one hypothesis that relates to at least a consumption of a type of medicine as depicted in FIG. 4a. For instance, the hypothesis selection module 104 of the computing device 10 selecting at least one hypothesis 81* that relates to at least a consumption of a type of medicine (e.g., pain killers such as aspirin or ibuprofen, cold medication, alpha blockers, insulin, and so forth).

In the same or different implementations, operation 408 may include an operation 411 for selecting at least one hypothesis that relates to at least a consumption of a type of nutraceutical as depicted in FIG. 4a. For instance, the hypothesis selection module 104 of the computing device 10 selecting at least one hypothesis 81* that relates to at least a consumption of a type of nutraceutical (e.g., carrots, broccoli, red wine, green tea, and so forth).

Figure 4B:
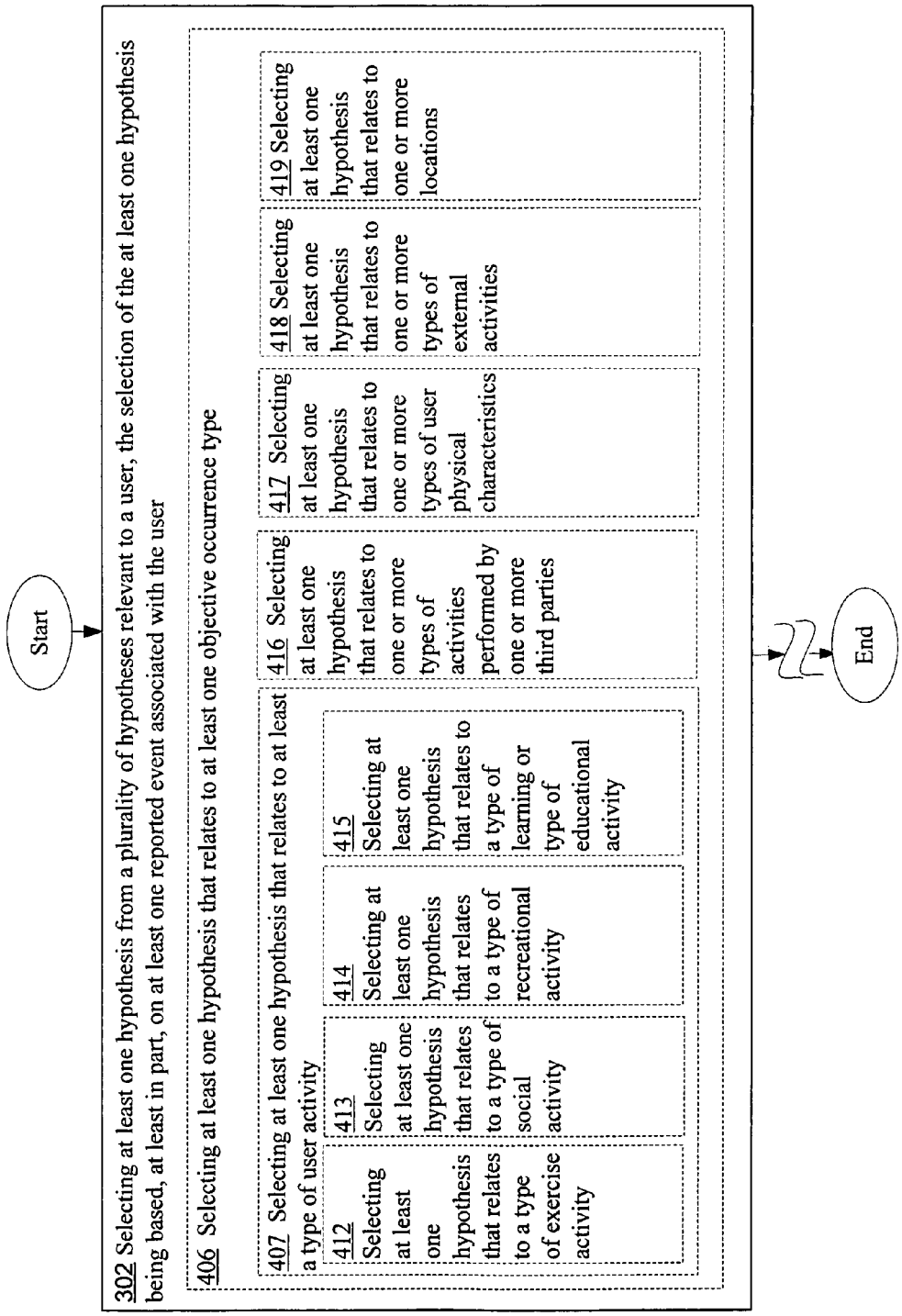
FIG. 4b is a high-level logic flowchart of a process depicting alternate implementations of the hypothesis selection operation 302 of FIG. 3.

In some implementations, operation 407 may include an operation 412 for selecting at least one hypothesis that relates to a type of exercise activity as depicted in FIG. 4b. For instance, the hypothesis selection module 104 of the computing device 10 selecting at least one hypothesis 81* that relates to a type of exercise activity (e.g., working out on an exercise machine such as a treadmill or elliptical machine, jogging, lifting weights, aerobics, swimming, and so forth).

In some implementations, operation 407 may include an operation 413 for selecting at least one hypothesis that relates to a type of social activity as depicted in FIG. 4b. For instance, the hypothesis selection module 104 of the computing device 10 selecting at least one hypothesis 81* that relates to a type of social activity (e.g., attending a party, dinner engagement with family and/or friends, playing with children, attending a play or movie with friends or family, playing golf with friends, and so forth).

In some implementations, operation 407 may include an operation 414 for selecting at least one hypothesis that relates to a type of recreational activity as depicted in FIG. 4b For instance, the hypothesis selection module 104 of the computing device 10 selecting at least one hypothesis 81* that relates to a type of recreational activity (e.g., playing golf or bowling, fishing, reading, watching television or movie, and so forth). Note that certain activities may belong to more than one objective occurrence type. For example, in the above, playing golf could be either a recreational activity or a social activity.

In some implementations, operation 407 may include an operation 415 for selecting at least one hypothesis that relates to a type of learning or type of educational activity as depicted in FIG. 4b. For instance, the hypothesis selection module 104 of the computing device 10 selecting at least one hypothesis 81* that relates to a type of learning or type of educational activity (e.g., reading a book, attending a class or lecture, and so forth).

In various implementations, operation 406 of FIG. 4a may include an operation 416 for selecting at least one hypothesis that relates to one or more types of activities performed by one or more third parties as depicted in FIG. 4b. For instance, the hypothesis selection module 104 of the computing device 10 selecting at least one hypothesis 81* that relates to one or more types of activities performed by one or more third parties 50 (e.g., a spouse or a boss going on a trip, children returning home from college, in-laws visiting, and so forth).

In the same or different implementations, operation 406 may include an operation 417 for selecting at least one hypothesis that relates to one or more types of user physical characteristics as depicted in FIG. 4b. For instance, the hypothesis selection module 104 of the computing device 10 selecting at least one hypothesis 81* that relates to one or more types of user physical characteristics (e.g., blood pressure, blood sugar level, heart rate, bacterial or viral infections, physical injuries, and so forth).

In the same or different implementations, operation 406 may include an operation 418 for selecting at least one hypothesis that relates to one or more types of external activities as depicted in FIG. 4b. For instance, the hypothesis selection module 104 of the computing device 10 selecting at least one hypothesis 81* that relates to one or more types of external activities (e.g., weather, performance of sports team, stock market performance, and so forth).

In the same or different implementations, operation 406 may include an operation 419 for selecting at least one hypothesis that relates to one or more locations as depicted in FIG. 4b. For instance, the hypothesis selection module 104 of the computing device 10 selecting at least one hypothesis 81* that relates to one or more locations (e.g., geographical locations such as Hawaii or place of employment).

Figure 4C:
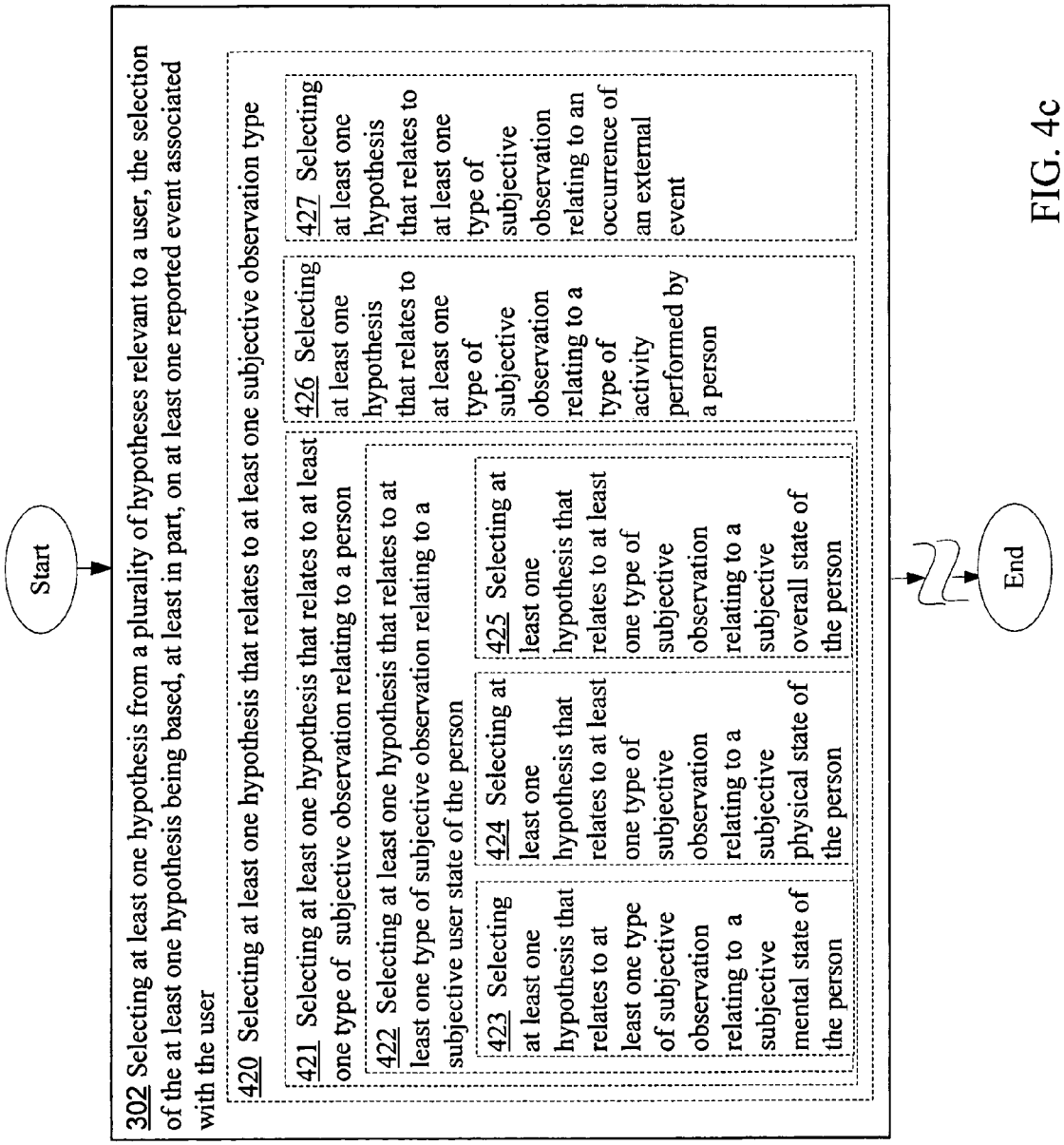
FIG. 4c is a high-level logic flowchart of a process depicting alternate implementations of the hypothesis selection operation 302 of FIG. 3.

In various implementations, the hypothesis selection operation 302 may include an operation 420 for selecting at least one hypothesis that relates to at least one subjective observation type as depicted in FIG. 4c. For instance, the hypothesis selection module 104 of the computing device 10 selecting at least one hypothesis 81* that relates to at least a subjective observation type (e.g., subjective interpretation of another person's activities or of external events).

Operation 420, in turn, may further include one or more additional operations in various alternative implementations. For example, in some implementations, operation 420 may include an operation 421 for selecting at least one hypothesis that relates to at least one type of subjective observation relating to a person as depicted in FIG. 4c. For instance, the hypothesis selection module 104 of the computing device 10 selecting at least one hypothesis 81* that relates to at least one type of subjective observation relating to a person (e.g., a subjective interpretation of another person's behavior or actions).

In some implementations, operation 421 may further include an operation 422 for selecting at least one hypothesis that relates to at least one type of subjective observation relating to a subjective user state of the person as depicted in FIG. 4c. For instance, the hypothesis selection module 104 of the computing device 10 selecting at least one hypothesis 81* that relates to at least one type of subjective observation relating to a subjective user state of the person (e.g., subjective mental state such as anger). For example, one person observing that a second person having a scowling expression and concluding or observing that the second person is angry.

Operation 422, in turn, may include one or more additional operations. For example, in some implementations, operation 422 may include an operation 423 for selecting at least one hypothesis that relates to at least one type of subjective observation relating to a subjective mental state of the person as depicted in FIG. 4c. For instance, the hypothesis selection module 104 of the computing device 10 selecting at least one hypothesis 81* that relates to at least one type of subjective observation relating to a subjective mental state of the person (e.g., a subjective observation made by a person about the alertness or inattentiveness of another person).

In the same or different implementations, operation 422 may include an operation 424 for selecting at least one hypothesis that relates to at least one type of subjective observation relating to a subjective physical state of the person as depicted in FIG. 4c. For instance, the hypothesis selection module 104 of the computing device 10 selecting at least one hypothesis 81* that relates to at least one type of subjective observation relating to a subjective physical state of the person (e.g., a subjective observation made by a person that another person is in pain).

In the same or different implementations, operation 422 may include an operation 425 for selecting at least one hypothesis that relates to at least one type of subjective observation relating to a subjective overall state of the person as depicted in FIG. 4c. For instance, the hypothesis selection module 104 of the computing device 10 selecting at least one hypothesis 81* that relates to at least one type of subjective observation relating to a subjective overall state of the person (e.g., a subjective observation made by a person that another person appears to be well).

In some implementations, operation 420 may include an operation 426 for selecting at least one hypothesis that relates to at least one type of subjective observation relating to a type of activity performed by a person as depicted in FIG. 4c. For instance, the hypothesis selection module 104 of the computing device 10 selecting at least one hypothesis 81* that relates to at least one type of subjective observation relating to a type of activity performed by a person (e.g., subjective observation made by a person of another person's work performance).

In some implementations, operation 420 may include an operation 427 for selecting at least one hypothesis that relates to at least one type of subjective observation relating to an occurrence of an external event as depicted in FIG. 4c. For instance, the hypothesis selection module 104 of the computing device 10 selecting at least one hypothesis 81* that relates to at least one type of subjective observation relating to an occurrence of an external event (e.g., a subjective observation of the performance of the stock market).

Figure 4D:
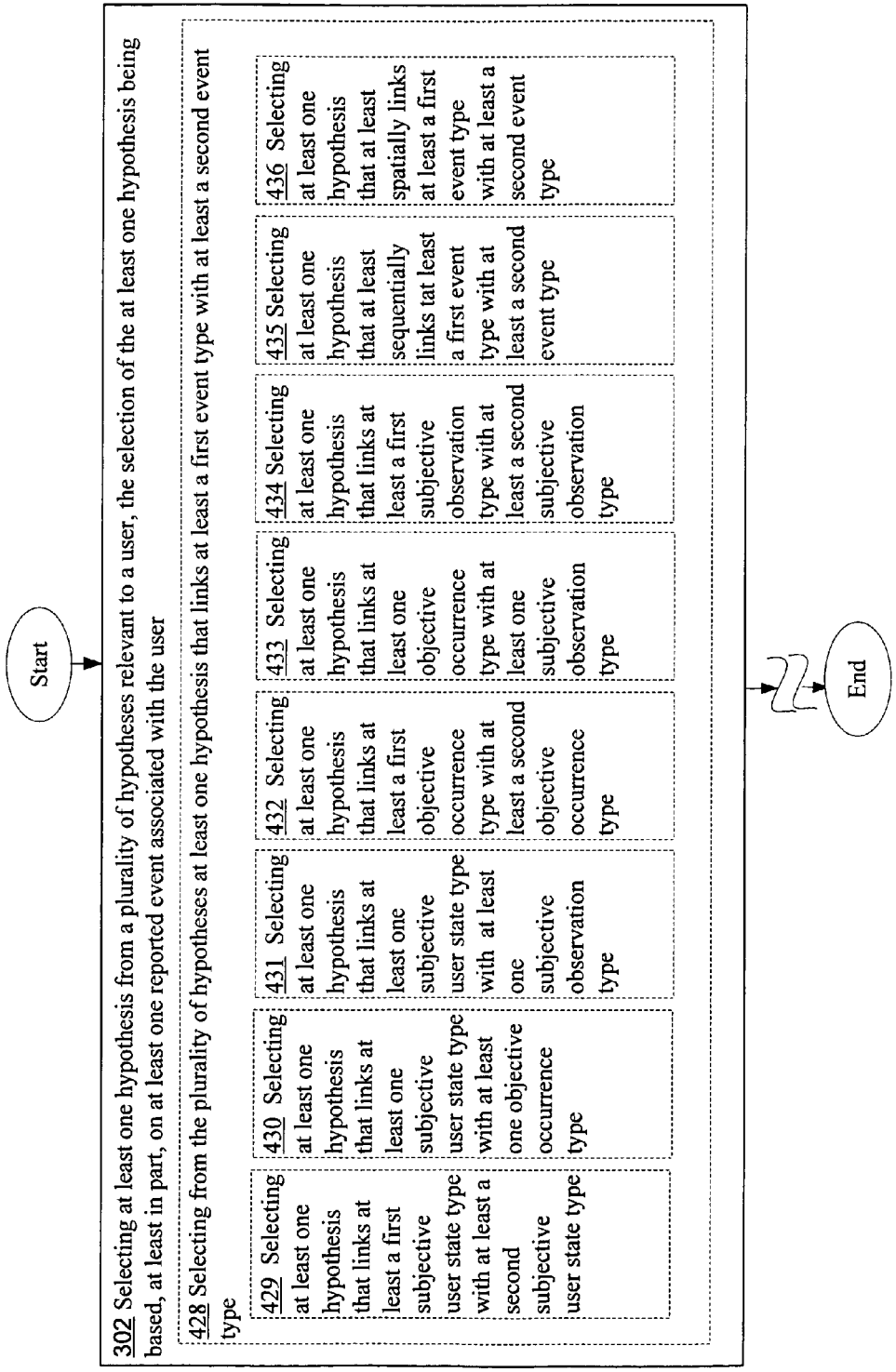
FIG. 4d is a high-level logic flowchart of a process depicting alternate implementations of the hypothesis selection operation 302 of FIG. 3.

Referring back to the hypothesis selection operation 302 of FIG. 3, in various implementations the hypothesis selection operation 302 may include an operation 428 for selecting from the plurality of hypotheses at least one hypothesis that links at least a first event type with at least a second event type as depicted in FIG. 4d. For instance, the hypothesis selection module 104 of the computing device 10 selecting from the plurality of hypotheses 80 at least one hypothesis 81* that links at least a first event type (e.g., a subjective user state type, an objective occurrence type, or a subjective observation type) with at least a second event type (e.g., a subjective user state type, an objective occurrence type, or a subjective observation type). Note that in various alternative implementations a hypothesis 81* may link two similar types of events such as two objective occurrences or two subjective user states. For example, a hypothesis 81* that links the consumption of rice with high blood sugar level, both of which are objective occurrences. In another example, linking together the feeling of depression that occurs prior to feeling elation, both of which are subjective user states.

Thus, in various implementations, operation 428 may involve selecting a hypothesis 81* that links similar or different types of events. For example, in some implementations, operation 428 may include an operation 429 for selecting at least one hypothesis that links at least a first subjective user state type with at least a second subjective user state type as depicted in FIG. 4d. For instance, the hypothesis selection module 104 of the computing device 10 selecting at least one hypothesis 81* that links at least a first subjective user state type (e.g., inattention or distracted) with at least a second subjective user state type (e.g., anger). For example, such a hypothesis 81* may suggest that a person may be inattentive whenever the person is angry.

In some implementations, operation 428 may include an operation 430 for selecting at least one hypothesis that links at least one subjective user state type with at least one objective occurrence type as depicted in FIG. 4d. For instance, the hypothesis selection module 104 of the computing device 10 selecting at least one hypothesis 81* that links at least one subjective user state type (e.g., subjective overall state such as "good") with at least one objective occurrence type (e.g., occurrence of an external event such as favorite sports team winning). For example, such a hypothesis 81* may suggest that a person may feel good when his/her favorite sports team wins.

In some implementations, operation 428 may include an operation 431 for selecting at least one hypothesis that links at least one subjective user state type with at least one subjective observation type as depicted in FIG. 4d. For instance, the hypothesis selection module 104 of the computing device 10 selecting at least one hypothesis 81* that links at least one subjective user state type (e.g., fatigued) with at least one subjective observation type (e.g., subjective observation of anger). For example, such a hypothesis 81* may suggest that a person when fatigued may appear to be angry by others.

In some implementations, operation 428 may include an operation 432 for selecting at least one hypothesis that links at least a first objective occurrence type with at least a second objective occurrence type as depicted in FIG. 4d. For instance, the hypothesis selection module 104 of the computing device 10 selecting at least one hypothesis 81* that links at least a first objective occurrence type (e.g., stock market crash) with at least a second objective occurrence type (e.g., high blood pressure). For example, such a hypothesis 81* may suggest that a person's blood pressure may elevate whenever the stock market crashes.

In some implementations, operation 428 may include an operation 433 for selecting at least one hypothesis that links at least one objective occurrence type with at least one subjective observation type as depicted in FIG. 4d. For instance, the hypothesis selection module 104 of the computing device 10 selecting at least one hypothesis 81* that links at least one objective occurrence type (e.g., reduced blood pressure) with at least one subjective observation type (e.g., happy boss). For example, such a hypothesis 81* may suggest that a person's blood pressure may be reduced when the person observes that the person's boss appears to be happy.

In some implementations, operation 428 may include an operation 434 for selecting at least one hypothesis that links at least a first subjective observation type with at least a second subjective observation type as depicted in FIG. 4d. For instance, the hypothesis selection module 104 of the computing device 10 selecting at least one hypothesis 81* that links at least a first subjective observation type (e.g., happy spouse) with at least a second subjective observation type (e.g., nice weather). For example, such a hypothesis 81* may suggest that when a spouse reports that the weather appears to be nice, the spouse may also appear to be happy as observed by the spouse's partner.

In some implementations, operation 428 may include an operation 435 for selecting at least one hypothesis that at least sequentially links at least a first event type with at least a second event type as depicted in FIG. 4d. For instance, the hypothesis selection module 104 of the computing device 10 selecting at least one hypothesis 81* that at least sequentially links at least a first event type (e.g., eating spicy foods) with at least a second event type (e.g., upset stomach). For example, such a hypothesis 81* may suggest that after eating spicy foods, a person may develop a stomach ache.

In some implementations, operation 428 may include an operation 436 for selecting at least one hypothesis that at least spatially links at least a first event type with at least a second event type as depicted in FIG. 4d. For instance, the hypothesis selection module 104 of the computing device 10 selecting at least one hypothesis 81* that at least spatially links at least a first event type (e.g., depression) with at least a second event type (happiness). For example, such a hypothesis 81* may suggest that a person is happier in Hawaii than being in Los Angeles.

Figure 4E:
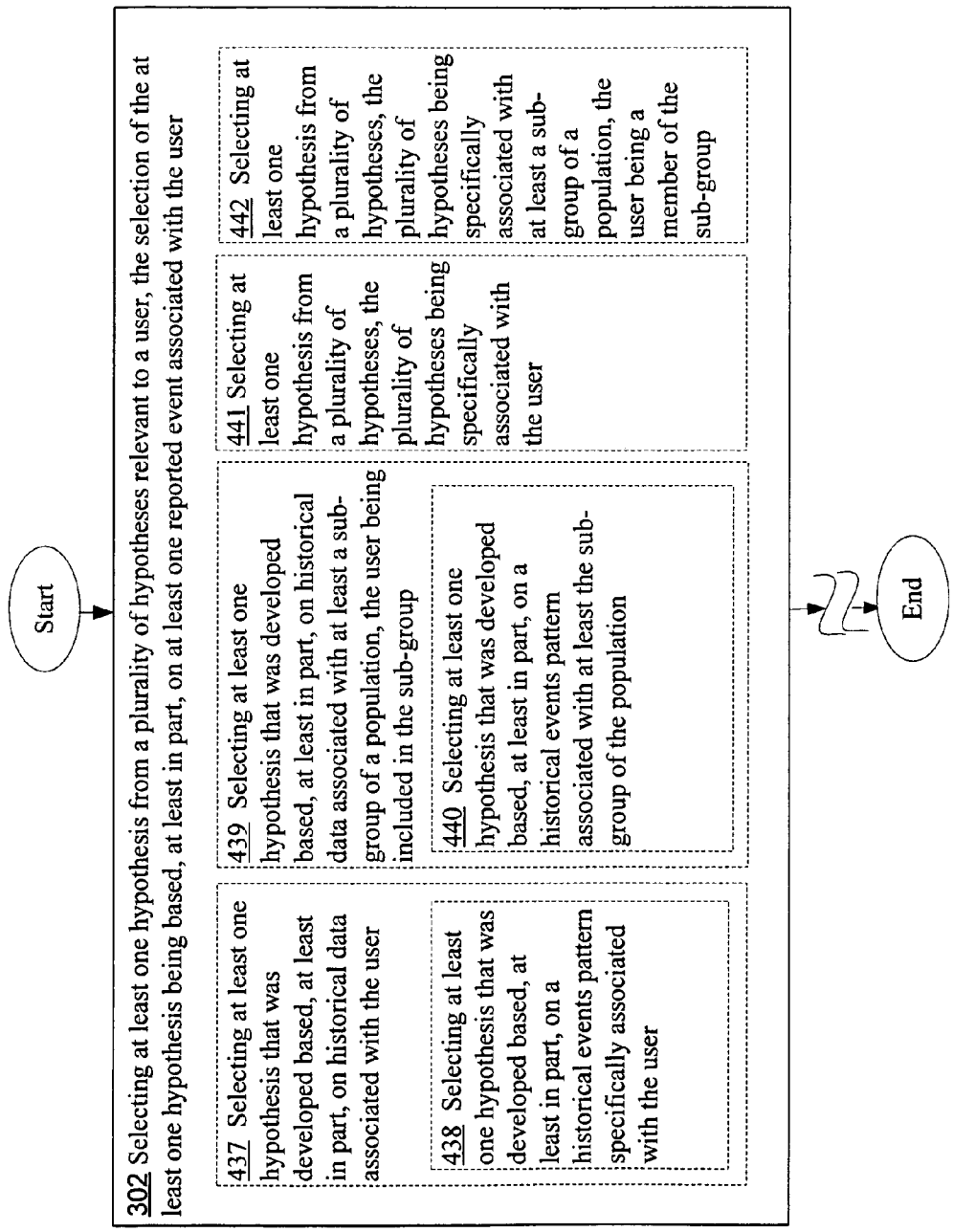
FIG. 4e is a high-level logic flowchart of a process depicting alternate implementations of the hypothesis selection operation 302 of FIG. 3.

In various implementations, the at least one hypothesis 81* (as well as, in some cases, the plurality of hypotheses 80), may have been originally developed based on historical data specifically associated with the user 20* or on historical data specifically associated with at least a sub-group of the general population that the user 20* belongs to. For example, in some implementations, the hypothesis selection operation 302 of FIG. 3 may include an operation 437 for selecting at least one hypothesis that was developed based, at least in part, on historical data associated with the user as depicted in FIG. 4e. For instance, the hypothesis selection module 104 of the computing device 10 selecting at least one hypothesis 81* that was developed based, at least in part, on historical data (e.g., historical medical data associated with the user 20*, previously reported events data including data indicating patterns of past reported events associated with the user 20*, and so forth) associated with the user 20*.

In some implementations, operation 437 may further include an operation 438 for selecting at least one hypothesis that was developed based, at least in part, on a historical events pattern specifically associated with the user as depicted in FIG. 4e. For instance, the hypothesis selection module 104 of the computing device 10 selecting at least one hypothesis 81* that was developed based, at least in part, on a historical events pattern (e.g., an events pattern that indicates increased relaxation following 30 minutes of exercise) specifically associated with the user 20*.

In various implementations, the hypothesis selection operation 302 of FIG. 3 may include an operation 439 for selecting at least one hypothesis that was developed based, at least in part, on historical data associated with at least a sub-group of a population, the user being included in the sub-group as depicted in FIG. 4e. For instance, the hypothesis selection module 104 of the computing device 10 selecting at least one hypothesis 81* that was developed based, at least in part, on historical data (e.g., medical data) associated with at least a sub-group (e.g., a particular ethnic group) of a population, the user 20* being included in the sub-group.

In some implementations, operation 439 may include an operation 440 for selecting at least one hypothesis that was developed based, at least in part, on a historical events pattern associated with at least the sub-group of the population as depicted in FIG. 4e. For instance, the hypothesis selection module 104 of the computing device 10 selecting at least one hypothesis 81* that was developed based, at least in part, on a historical events pattern (e.g., an events pattern that indicates a relationship between diarrhea and consumption of dairy products) associated with at least the sub-group of the population.

In some implementations, the hypothesis selection operation 302 may include an operation 441 for selecting at least one hypothesis from a plurality of hypotheses, the plurality of hypotheses being specifically associated with the user as depicted in FIG. 4e. For instance, the hypothesis selection module 104 of the computing device 10 selecting at least one hypothesis 81* from a plurality of hypotheses 80, the plurality of hypotheses 80 being specifically associated with the user 20*. For example, each of the plurality of hypothesis 80 may have been developed based on patterns of reported events associated with the user 20*.

In various implementations, the hypothesis selection operation 302 may include an operation 442 for selecting at least one hypothesis from a plurality of hypotheses, the plurality of hypotheses being specifically associated with at least a sub-group of a population, the user being a member of the sub-group as depicted in FIG. 4e. For instance, the hypothesis selection module 104 of the computing device 10 selecting at least one hypothesis 81* from a plurality of hypotheses 80, the plurality of hypotheses 80 being specifically associated with at least a sub-group of a population, the user 20* being a member of the sub-group. For example, each of the plurality of hypotheses 80 may have been developed based on patterns of reported events associated with at least a sub-group (e.g., gender or age group) of the general population.

Figure 4F:
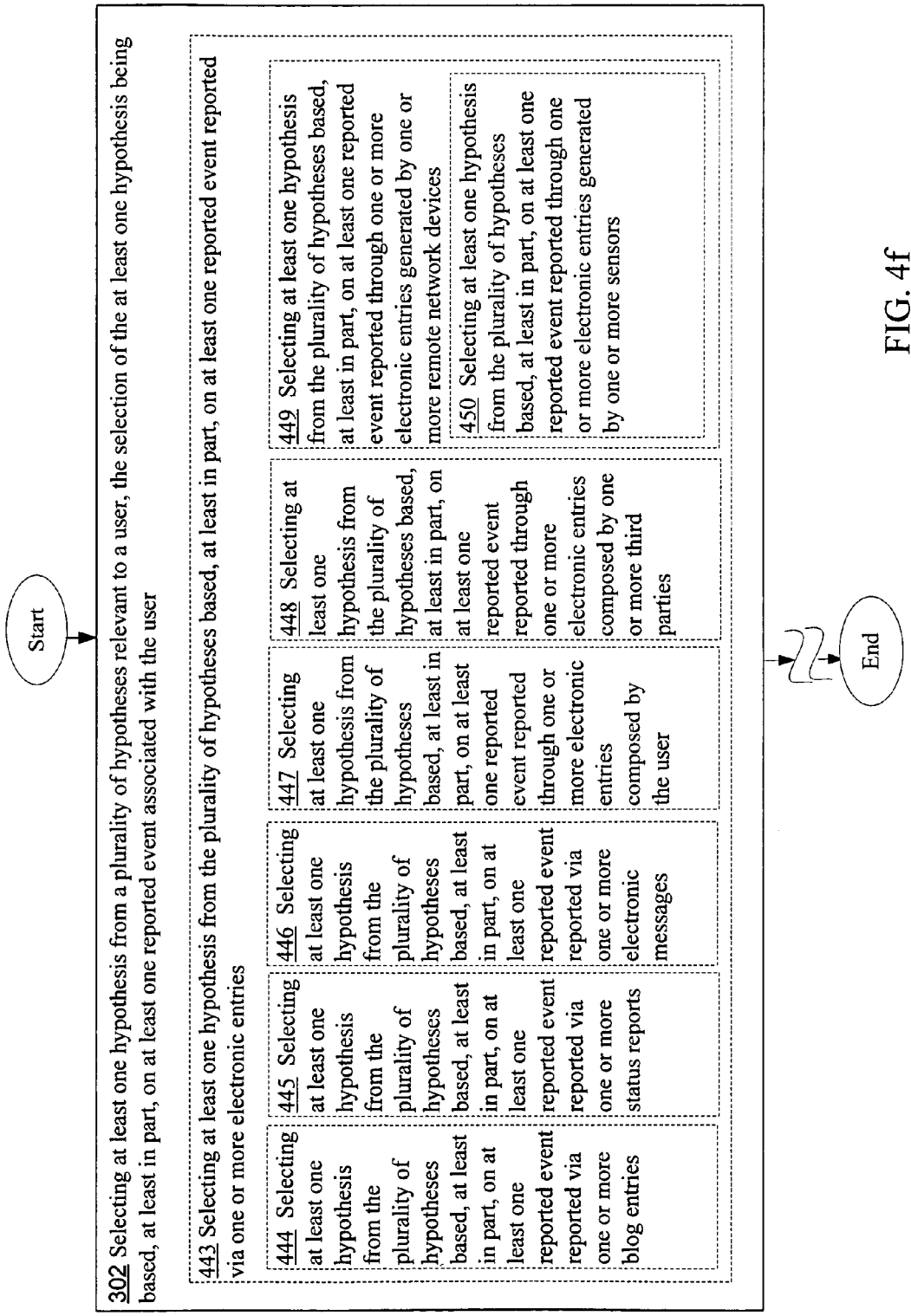
FIG. 4f is a high-level logic flowchart of a process depicting alternate implementations of the hypothesis selection operation 302 of FIG. 3.

The selection of the at least one hypothesis 81* in the hypothesis selection operation 302 of FIG. 3 may be based on a reported event that may have been reported through a variety of reporting methods. For example, in various implementations, the hypothesis selection operation 302 may include an operation 443 for selecting at least one hypothesis from the plurality of hypotheses based, at least in part, on at least one reported event reported via one or more electronic entries as depicted in FIG. 4f. For instance, the hypothesis selection module 104 of the computing device 10 selecting at least one hypothesis 81* from the plurality of hypotheses 80 based, at least in part, on at least one reported event (e.g., as referenced by the reported event referencing module 208 of the computing device 10) reported via one or more electronic entries (e.g., blog or microblog entries, status report entries, diary entries, instant message entries, text messaging entries, and so forth)) as received by, for example, reception module 202.

In particular, operation 443 may include an operation 444 for selecting at least one hypothesis from the plurality of hypotheses based, at least in part, on at least one reported event reported via one or more blog entries in various implementations and as depicted in FIG. 4f. For instance, the hypothesis selection module 104 of the computing device 10 selecting at least one hypothesis 81* from the plurality of hypotheses 80 based, at least in part, on at least one reported event reported via one or more blog entries (e.g., microblog entries as provided by the user 20* or by one or more third parties 50 such as other users) as received by, for example, reception module 202.

In some implementations, operation 443 may include an operation 445 for selecting at least one hypothesis from the plurality of hypotheses based, at least in part, on at least one reported event reported via one or more status reports as depicted in FIG. 4f. For instance, the hypothesis selection module 104 of the computing device 10 selecting at least one hypothesis 81* from the plurality of hypotheses 80 based, at least in part, on at least one reported event reported via one or more status reports (e.g., as provided by the user 20* or by one or more third parties 50 such as other users) as received by, for example, reception module 202.

In some implementations, operation 443 may include an operation 446 for selecting at least one hypothesis from the plurality of hypotheses based, at least in part, on at least one reported event reported via one or more electronic messages as depicted in FIG. 4f. For instance, the hypothesis selection module 104 of the computing device 10 selecting at least one hypothesis 81* from the plurality of hypotheses 80 based, at least in part, on at least one reported event reported via one or more electronic messages such as email messages, text messages, IM messages, and so forth (e.g., as provided by the user 20* or by one or more third parties 50 such as other users) and as received by, for example, reception module 202.

In some implementations, operation 443 may include an operation 447 for selecting at least one hypothesis from the plurality of hypotheses based, at least in part, on at least one reported event reported through one or more electronic entries composed by the user as depicted in FIG. 4f. For instance, the hypothesis selection module 104 of the computing device 10 selecting at least one hypothesis 81* from the plurality of hypotheses 80 based, at least in part, on at least one reported event reported through one or more electronic entries (e.g., blog or microblog entries, status report entries, diary entries, instant message entries, text messaging entries, and so forth) composed by the user 20* and as received by, for example, reception module 202.

In some implementations, operation 443 may include an operation 448 for selecting at least one hypothesis from the plurality of hypotheses based, at least in part, on at least one reported event reported through one or more electronic entries composed by one or more third parties as depicted in FIG. 4f. For instance, the hypothesis selection module 104 of the computing device 10 selecting at least one hypothesis 81* from the plurality of hypotheses 80 based, at least in part, on at least one reported event reported through one or more electronic entries (e.g., blog or microblog entries, status report entries, diary entries, instant message entries, text messaging entries, and so forth) composed by one or more third parties 50 and as received by, for example, reception module 202.

In some implementations, operation 443 may include an operation 449 for selecting at least one hypothesis from the plurality of hypotheses based, at least in part, on at least one reported event reported through one or more electronic entries generated by one or more remote network devices as depicted in FIG. 4f. For instance, the hypothesis selection module 104 of the computing device 10 selecting at least one hypothesis 81* from the plurality of hypotheses 80 based, at least in part, on at least one reported event reported through one or more electronic entries generated by one or more remote network devices (e.g., network servers, work stations, blood pressure monitors, glucometers, heart rate monitors, GPS, exercise machine sensors, pedometer, accelerometer to measure user movements, toilet monitors to monitor toilet use, and so forth) and as received by, for example, reception module 202.

In some implementations, operation 449 may further include an operation 450 for selecting at least one hypothesis from the plurality of hypotheses based, at least in part, on at least one reported event reported through one or more electronic entries generated by one or more sensors as depicted in FIG. 4f. For instance, the hypothesis selection module 104 of the computing device 10 selecting at least one hypothesis 81* from the plurality of hypotheses 80 based, at least in part, on at least one reported event reported through one or more electronic entries generated by one or more sensors 35 (e.g., blood pressure monitors, glucometers, heart rate monitors, GPS, exercise machine sensors, pedometer, accelerometer to measure user movements, toilet monitors to monitor toilet use, and so forth) and as received by, for example, reception module 202.

Figure 4G:
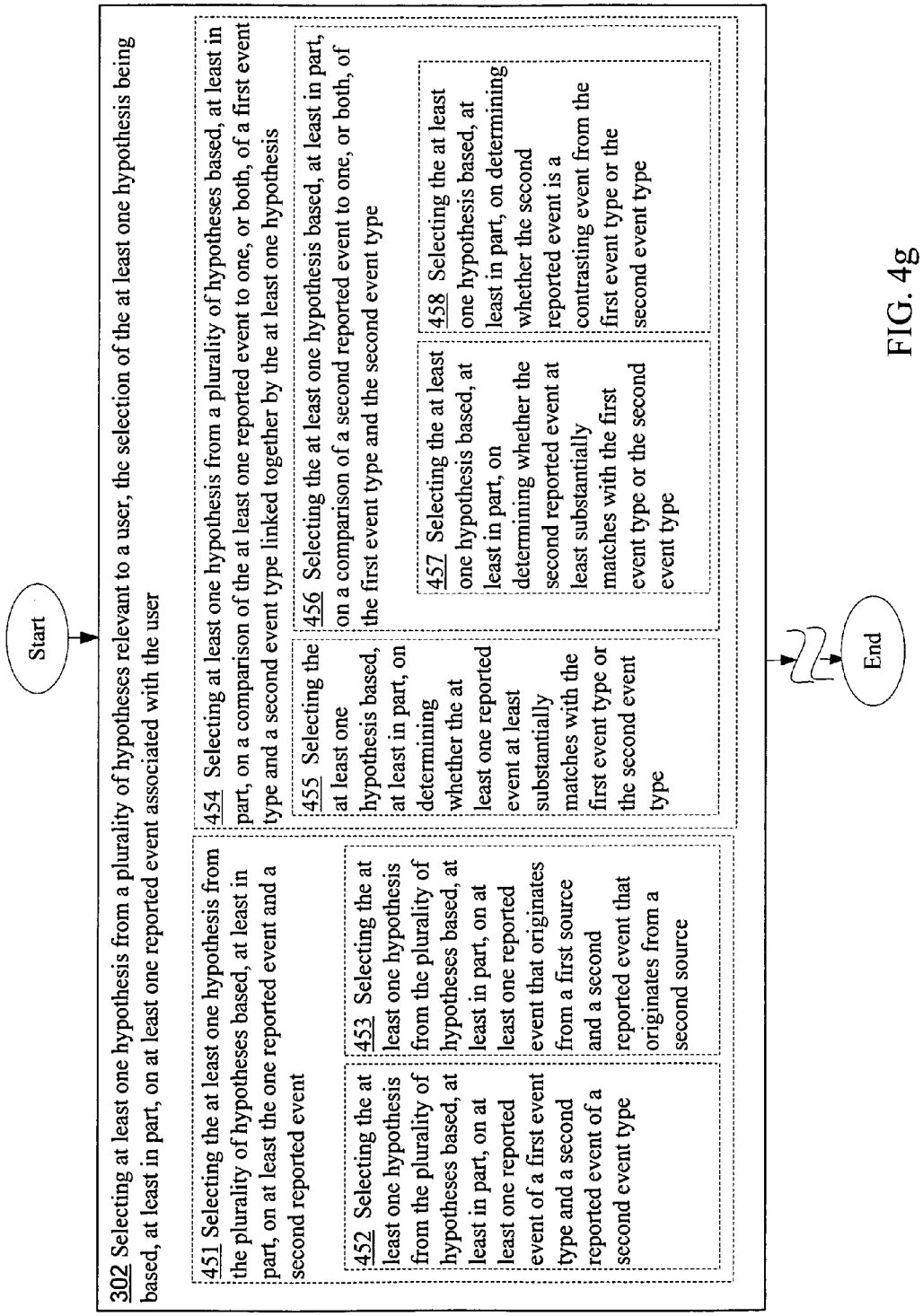
FIG. 4g is a high-level logic flowchart of a process depicting alternate implementations of the hypothesis selection operation 302 of FIG. 3.

In various implementations, the hypothesis selection operation 302 of FIG. 3 may make the selection of the at least one hypothesis 81* based on a plurality of reported events. For example, in some implementations, the hypothesis selection operation 302 may include an operation 451 for selecting the at least one hypothesis from the plurality of hypotheses based, at least in part, on at least the one reported event and a second reported event as depicted in FIG. 4g. For instance, the hypothesis selection module 104 of the computing device 10 selecting at least one hypothesis 81* from the plurality of hypotheses 80 based, at least in part, on at least the one reported event (e.g., a subjective user state, an objective occurrence, or a subjective occurrence) and a second reported event (e.g., a subjective user state, an objective occurrence, or a subjective occurrence).

In some implementations, operation 451 may include an operation 452 for selecting the at least one hypothesis from the plurality of hypotheses based, at least in part, on at least one reported event of a first event type and a second reported event of a second event type as depicted in FIG. 4g. For instance, the hypothesis selection module 104 of the computing device 10 selecting at least one hypothesis 81* from the plurality of hypotheses 80 based, at least in part, on at least one reported event of a first event type (e.g., subjective user state) and a second reported event of a second event type (e.g., objective occurrence).

In some implementations, operation 451 may include an operation 453 for selecting the at least one hypothesis from the plurality of hypotheses based, at least in part, on at least one reported event that originates from a first source and a second reported event that originates from a second source as depicted in FIG. 4g. For instance, the hypothesis selection module 104 of the computing device 10 selecting at least one hypothesis 81* from the plurality of hypotheses 80 based, at least in part, on at least one reported event that originates from a first source (e.g., user 20*) and a second reported event that originates from a second source (e.g., one or more sensors 35 or one or more third parties 50).

Various approaches may be employed in the hypothesis selection operation 302 of FIG. 3 in order to select the at least one hypothesis 81* from the plurality of hypotheses 80 based on the at least one reported event. For example, in some implementations, the hypothesis selection operation 302 may include an operation 454 for selecting at least one hypothesis from a plurality of hypotheses based, at least in part, on a comparison of the at least one reported event to one, or both, of a first event type and a second event type linked together by the at least one hypothesis as depicted in FIG. 4g. For instance, the hypothesis selection module 104 of the computing device 10 selecting at least one hypothesis 81* from a plurality of hypotheses 80 based, at least in part, on a comparison (e.g., as made by the comparison module 210) of the at least one reported event (e.g., reporting consumption of alcoholic beverage) to one, or both, of a first event type (e.g., feeling a hangover) and a second event type (e.g., consuming alcoholic beverage) linked together by the at least one hypothesis 81*.

In some implementations, operation 454 may further include an operation 455 for selecting the at least one hypothesis based, at least in part, on determining whether the at least one reported event at least substantially matches with the first event type or the second event type as depicted in FIG. 4g. For instance, the hypothesis selection module 104 of the computing device 10 selecting the at least one hypothesis 81* based, at least in part, on determining whether the at least one reported event (e.g., reporting a cloudy weather) at least substantially matches (e.g., as substantially matched by the matching module 212) with the first event type (e.g., feeling melancholy) or the second event type (e.g., overcast weather).

In some implementations, operation 454 may include an operation 456 for selecting the at least one hypothesis based, at least in part, on a comparison of a second reported event to one, or both, of the first event type and the second event type as depicted in FIG. 4g. For instance, the hypothesis selection module 104 of the computing device 10 selecting the at least one hypothesis 81* based, at least in part, on a comparison (e.g., as compared by the comparison module 210) of a second reported event (e.g., reporting a hangover) to one, or both, of the first event type (e.g., consuming alcoholic beverage) and the second event type (e.g., feeling a hangover).

In various implementations, operation 456 may further include an operation 457 for selecting the at least one hypothesis based, at least in part, on determining whether the second reported event at least substantially matches with the first event type or the second event type as depicted in FIG. 4g. For instance, the hypothesis selection module 104 of the computing device 10 selecting the at least one hypothesis 81* based, at least in part, on determining whether the second reported event (e.g., reporting feeling depressed) at least substantially matches (e.g., as substantially matched by the matching module 212) with the first event type (e.g., overcast weather) or the second event type (e.g., feeling melancholy).

In some implementations, operation 456 may include an operation 458 for selecting the at least one hypothesis based, at least in part, on determining whether the second reported event is a contrasting event from the first event type or the second event type as depicted in FIG. 4g. For instance, the hypothesis selection module 104 of the computing device 10 selecting the at least one hypothesis 81* based, at least in part, on determining whether the second reported event (e.g., reporting feeling happy) is a contrasting event (e.g., as determined by the contrasting module 214) from the first event type (e.g., overcast weather) or the second event type (e.g., feeling melancholy). Note that such an operation may ultimately result in the assessment that the at least one hypothesis 81* is not a sound or strong hypothesis particularly as it relates to, for example, the user 20*.

Figure 4H:
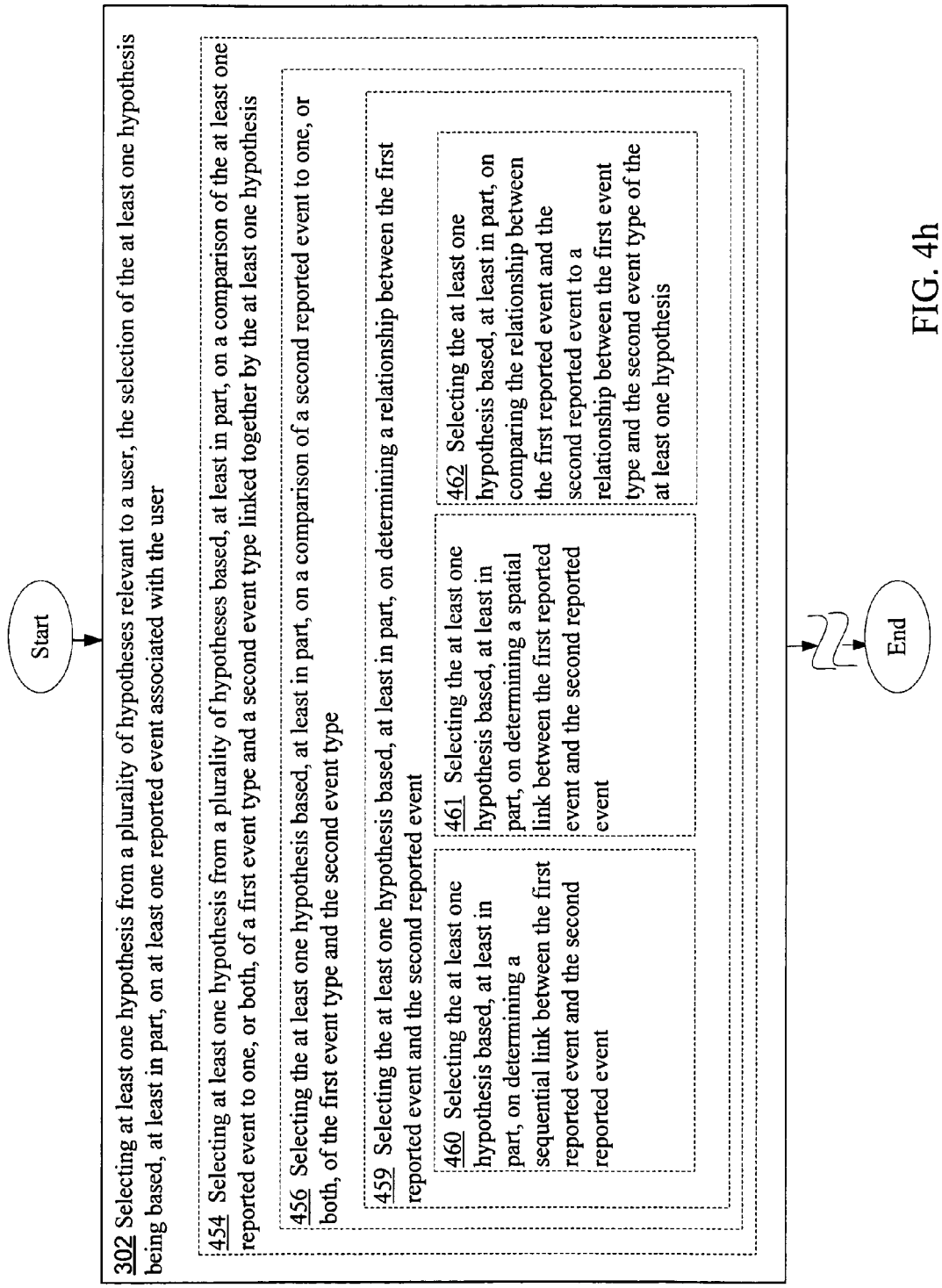
FIG. 4h is a high-level logic flowchart of a process depicting alternate implementations of the hypothesis selection operation 302 of FIG. 3.

In some implementations, operation 456 may include an operation 459 for selecting the at least one hypothesis based, at least in part, on determining a relationship between the first reported event and the second reported event as depicted in FIG. 4h. For instance, the hypothesis selection module 104 of the computing device 10 selecting the at least one hypothesis 81* based, at least in part, on determining a relationship (e.g., the relationship determination module 216 determining a sequential or spatial relationship) between the first reported event (e.g., high blood sugar level) and the second reported event (e.g., consuming white rice).

Operation 459, in some implementations, may include an operation 460 for selecting the at least one hypothesis based, at least in part, on determining a sequential link between the first reported event and the second reported event as depicted in FIG. 4h. For instance, the hypothesis selection module 104 of the computing device 10 selecting the at least one hypothesis 81* based, at least in part, on determining a sequential link (e.g., the sequential link determination module 218 determining a temporal relationship or a more specific time relationship) between the first reported event and the second reported event.

In some implementations, operation 459 may include an operation 461 for selecting the at least one hypothesis based, at least in part, on determining a spatial link between the first reported event and the second reported event as depicted in FIG. 4h. For instance, the hypothesis selection module 104 of the computing device 10 selecting the at least one hypothesis 81* based, at least in part, on determining a spatial link (e.g., as determined by the spatial link determination module 220) between the first reported event and the second reported event.

In some implementations, operation 459 may include an operation 462 for selecting the at least one hypothesis based, at least in part, on comparing the relationship between the first reported event and the second reported event to a relationship between the first event type and the second event type of the at least one hypothesis as depicted in FIG. 4h. For instance, the hypothesis selection module 104 of the computing device 10 selecting the at least one hypothesis 81* based, at least in part, on comparing (e.g., as compared by the comparison module 210) the relationship between the first reported event and the second reported event to a relationship between the first event type and the second event type of the at least one hypothesis 81*.

Figure 4I:
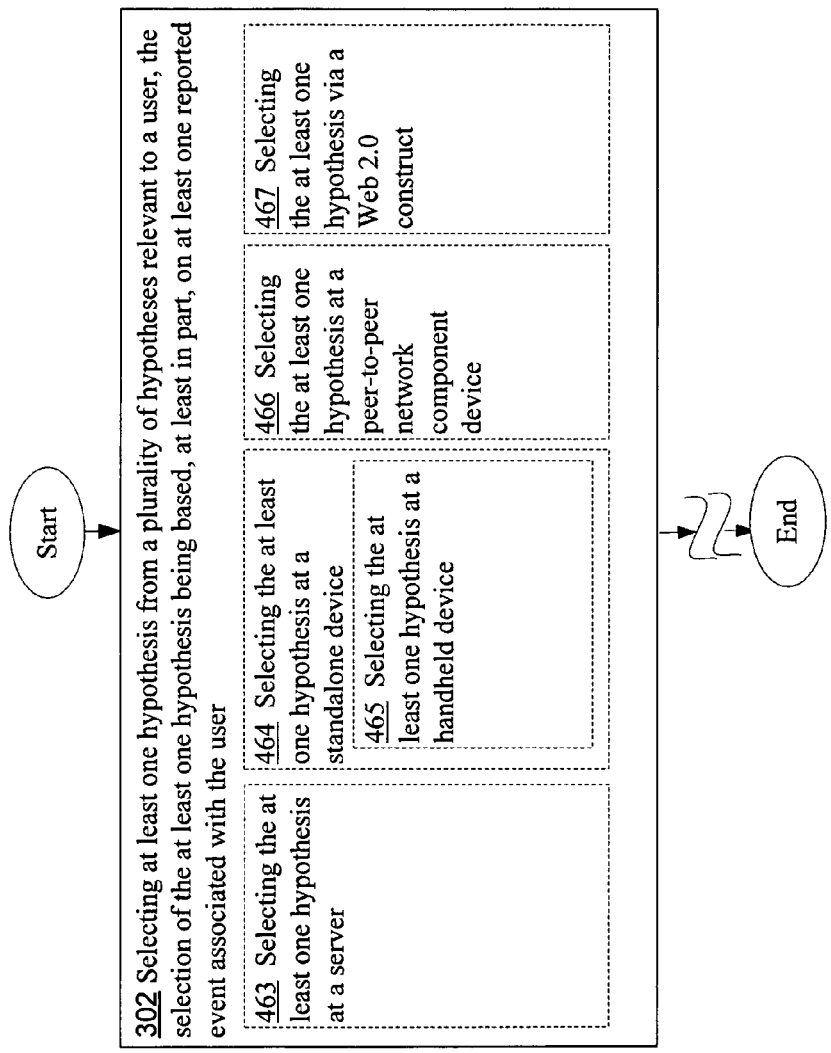
FIG. 4i is a high-level logic flowchart of a process depicting alternate implementations of the hypothesis selection operation 302 of FIG. 3.

The hypothesis selection operation 302 of FIG. 3 may be executed in various types of devices in various environments. For example, in some implementations, the hypothesis selection operation 302 may include an operation 463 for selecting the at least one hypothesis at a server as depicted in FIG. 4i. For instance, the hypothesis selection module 104 of the computing device 10 selecting the at least one hypothesis 81* when the computing device 10 is a network server.

In other alternative implementations, the hypothesis selection operation 302 may include an operation 464 for selecting the at least one hypothesis at a standalone device as depicted in FIG. 4i. For instance, the hypothesis selection module 104 of the computing device 10 selecting the at least one hypothesis 81* when the computing device 10 is a standalone device (e.g., a desktop computer, a laptop computer, a workstation, or a handheld device such as a cellular telephone, a smartphone, a PDA, an MID, an UMPC, and so forth).

In some implementations, operation 464 may further include an operation 465 for selecting the at least one hypothesis at a handheld device as depicted in FIG. 4i. For instance, the hypothesis selection module 104 of the computing device 10 selecting the at least one hypothesis 81* when the computing device 10 is a handheld device (e.g., cellular telephone, a smartphone, a PDA, an MID, an UMPC, and so forth).

In some implementations, the hypothesis selection operation 302 may include an operation 466 for selecting the at least one hypothesis at a peer-to-peer network component device as depicted in FIG. 4i. For instance, the hypothesis selection module 104 of the computing device 10 selecting the at least one hypothesis 81* when the computing device 10 is a peer-to-peer network component device.

In some implementations, the hypothesis selection operation 302 may include an operation 467 for selecting the at least one hypothesis via a Web 2.0 construct as depicted in FIG. 4i. For instance, the hypothesis selection module 104 of the computing device 10 selecting the at least one hypothesis 81* via a Web 2.0 construct (e.g., Web 2.0 application 268).

Figure 5A:
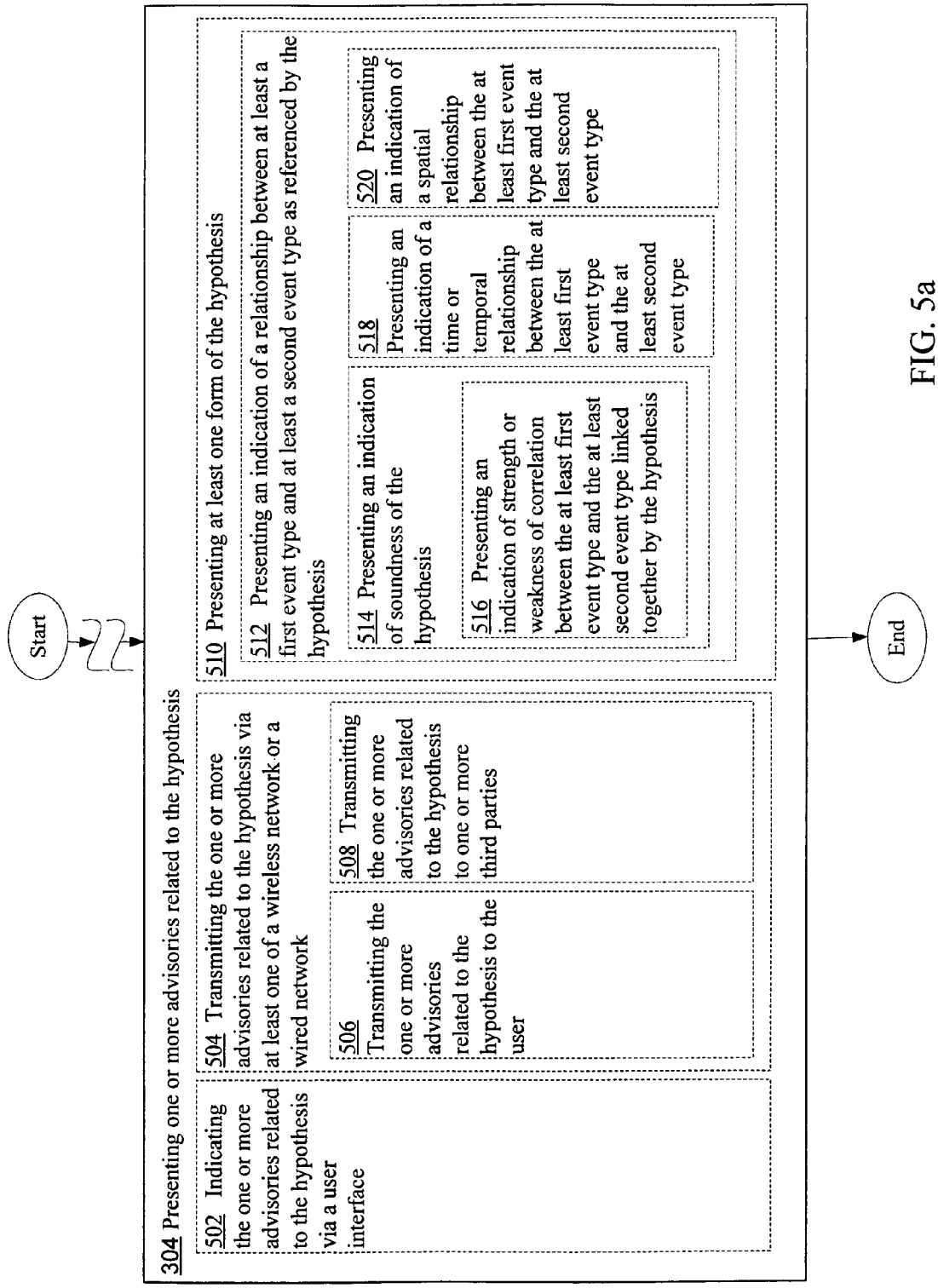
FIG. 5a is a high-level logic flowchart of a process depicting alternate implementations of the advisory presentation operation 304 of FIG. 3.

Referring back to the operational flow 300 of FIG. 3, the advisory presentation operation 304 of operational flow 300 may be executed in a number different ways in various alternative implementations. For example, in some implementations, the advisory presentation operation 304 may include an indication operation 502 for indicating the one or more advisories related to the hypothesis via a user interface as depicted in FIG. 5a. For instance, the indication module 222 (see FIG. 2c) of the computing device 10 indicating the one or more advisories related to the hypothesis 81* via a user interface 122 (e.g., a display monitor such as a liquid crystal display, a touch screen, an audio system including one or more speakers, and/or other interface devices).

In various implementations, the advisory presentation operation 304 may include a transmission operation 504 for transmitting the one or more advisories related to the hypothesis via at least one of a wireless network or a wired network as depicted in FIG. 5a. For instance, the transmission module 224 (see FIG. 2c) of the computing device 10 transmitting the one or more advisories 90 (e.g., a recommendation for a future action based on the hypothesis 81* or an alert regarding the hypothesis 81*) related to the hypothesis 81* via at least one of a wireless network or a wired network 40. In some cases, the computing device 10 may employ a network interface 120 in order to transmit the one or more advisories 90.

In some implementations, the transmission operation 504 may include an operation 506 for transmitting the one or more advisories related to the hypothesis to the user as depicted in FIG. 5a. For instance, the transmission module 224 of the computing device 10 transmitting the one or more advisories 90 related to the hypothesis 81* to the user 20a. For example, transmitting to the user 20a an advisory relating to the soundness of the hypothesis 81* in the form of a text or audio message such as "you seem to always have a stomach ache after you eat spicy foods" or "there may be a strong link between your melancholy feelings and cloudy weather."

In some implementations, the transmission operation 504 may include an operation 508 for transmitting the one or more advisories related to the hypothesis to one or more third parties as depicted in FIG. 5a. For instance, the transmission module 224 of the computing device 10 transmitting the one or more advisories 90 related to the hypothesis 81* to one or more third parties 50 (e.g., other users, network service providers, content providers, advertisers, and so forth).

In some implementations, the advisory presentation operation 304 may include a hypothesis presentation operation 510 for presenting at least one form of the hypothesis as depicted in FIG. 5a. For instance, the hypothesis presentation module 226 of the computing device 10 presenting (e.g., either transmitting via a network interface 120 or indicating via a user interface 122) at least one form of the hypothesis 81* (e.g., in a graphical or iconic form, in audio form, and/or in a textual form).

In various implementations, the hypothesis presentation operation 510 may include an operation 512 for presenting an indication of a relationship between at least a first event type and at least a second event type as referenced by the hypothesis as depicted in FIG. 5a. For instance, the event types relationship presentation module 228 of the computing device 10 presenting an indication of a relationship (e.g., sequential or spatial relationship) between at least a first event type (e.g., a subjective user state) and at least a second event type (e.g., an objective occurrence) as referenced by the hypothesis 81*.

In various implementations, operation 512 may include an operation 514 for presenting an indication of soundness of the hypothesis as depicted in FIG. 5a. For instance, the soundness presentation module 230 of the computing device 10 presenting (e.g., either transmitting via a network interface 120 or indicating via a user interface 122) an indication of soundness of the hypothesis 81*. For example, indicating that the hypothesis 81* is a weak or a strong hypothesis.

In some implementations, operation 514 may further include an operation 516 for presenting an indication of strength or weakness of correlation between the at least first event type and the at least second event type linked together by the hypothesis as depicted in FIG. 5a. For instance, the strength/weakness presentation module 232 of the computing device 10 presenting (e.g., either transmitting via a network interface 120 or indicating via a user interface 122) an indication of strength or weakness of correlation between the at least first event type (e.g., stomach ache) and the at least second event type (e.g., consuming spicy foods) linked together by the hypothesis 81*. For example indicating that there is a strong or weak link between eating spicy foods and stomach ache.

In some implementations, operation 512 may include an operation 518 for presenting an indication of a time or temporal relationship between the at least first event type and the at least second event type as depicted in FIG. 5a. For instance, the time/temporal relationship presentation module 234 of the computing device 10 presenting (e.g., either transmitting via a network interface 120 or indicating via a user interface 122) an indication of a time or temporal relationship between the at least first event type (e.g., feeling alert) and the at least second event type (e.g., exercising). For example, indicating that if the user 20* exercises, the user 20* may feel more alert afterwards.

In some implementations, operation 512 may include an operation 520 for presenting an indication of a spatial relationship between the at least first event type and the at least second event type as depicted in FIG. 5a. For instance, the spatial relationship presentation module 236 of the computing device 10 presenting (e.g., either transmitting via a network interface 120 or indicating via a user interface 122) an indication of a spatial relationship between the at least first event type (e.g., feeling relaxed) and the at least second event type (e.g., spouse visiting a business client). For example, indicating that the user 20* is more relaxed at home when the user's spouse is away in California on a business trip.

Figure 5B:
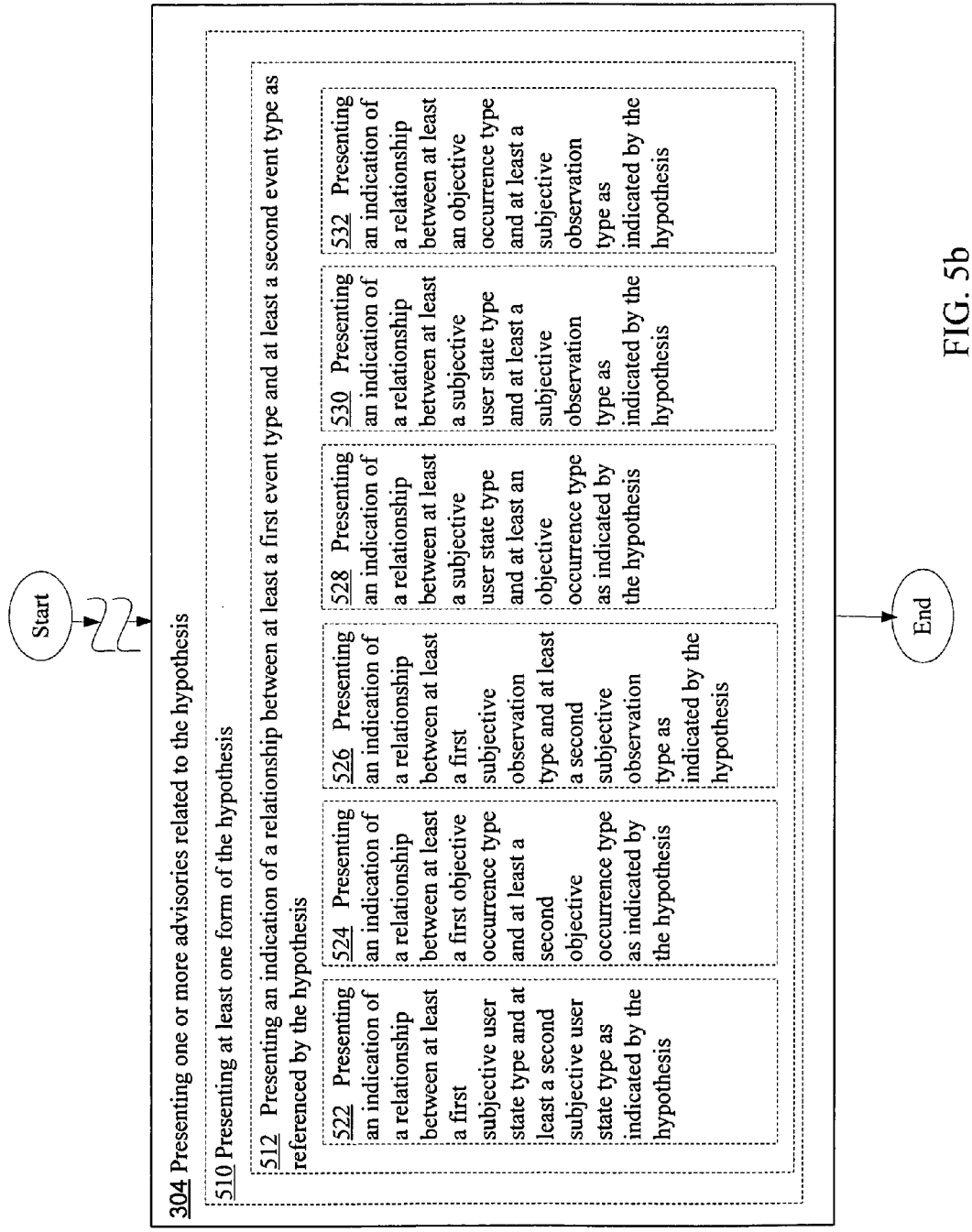
FIG. 5b is a high-level logic flowchart of a process depicting alternate implementations of the advisory presentation operation 304 of FIG. 3.

In various implementations, operation 512 of FIG. 5a may include an operation 522 for presenting an indication of a relationship between at least a first subjective user state type and at least a second subjective user state type as indicated by the hypothesis as depicted in FIG. 5b. For instance, the event types relationship presentation module 228 of the computing device 10 presenting (e.g., either transmitting via a network interface 120 or indicating via a user interface 122) an indication of a relationship (e.g., sequential relationship or spatial relationship) between at least a first subjective user state type (e.g., anger) and at least a second subjective user state type (e.g., mental fatigue) as indicated by the hypothesis 81*.

In some implementations, operation 512 may include an operation 524 for presenting an indication of a relationship between at least a first objective occurrence type and at least a second objective occurrence type as indicated by the hypothesis as depicted in FIG. 5b. For instance, the event types relationship presentation module 228 of the computing device 10 presenting (e.g., either transmitting via a network interface 120 or indicating via a user interface 122) an indication of a relationship (e.g., sequential relationship or spatial relationship) between at least a first objective occurrence type (e.g., consumption of a particular medication) and at least a second objective occurrence type (e.g., elevated blood pressure) as indicated by the hypothesis 81*.

In some implementations, operation 512 may include an operation 526 for presenting an indication of a relationship between at least a first subjective observation type and at least a second subjective observation type as indicated by the hypothesis as depicted in FIG. 5b. For instance, the event types relationship presentation module 228 of the computing device 10 presenting (e.g., either transmitting via a network interface 120 or indicating via a user interface 122) an indication of a relationship (e.g., sequential relationship or spatial relationship) between at least a first subjective observation type (e.g., an observation that the workload at a place of employment appears to be heavy) and at least a second subjective observation type (e.g., an observation that a worker appears to be very tense) as indicated by the hypothesis 81*.

In some implementations, operation 512 may include an operation 528 for presenting an indication of a relationship between at least a subjective user state type and at least an objective occurrence type as indicated by the hypothesis as depicted in FIG. 5b. For instance, the event types relationship presentation module 228 of the computing device 10 presenting (e.g., either transmitting via a network interface 120 or indicating via a user interface 122) an indication of a relationship (e.g., sequential relationship or spatial relationship) between at least a subjective user state type (e.g., anger) and at least an objective occurrence type (e.g., elevated blood pressure) as indicated by the hypothesis 81*.

In some implementations, operation 512 may include an operation 530 for presenting an indication of a relationship between at least a subjective user state type and at least a subjective observation type as indicated by the hypothesis as depicted in FIG. 5b. For instance, the event types relationship presentation module 228 of the computing device 10 presenting (e.g., either transmitting via a network interface 120 or indicating via a user interface 122) an indication of a relationship (e.g., sequential relationship or spatial relationship) between at least a subjective user state type (e.g., elation) and at least a subjective observation type (e.g., observation that the stock market is performing well) as indicated by the hypothesis 81*.

In some implementations, operation 512 may include an operation 532 for presenting an indication of a relationship between at least an objective occurrence type and at least a subjective observation type as indicated by the hypothesis as depicted in FIG. 5b. For instance, the event types relationship presentation module 228 of the computing device 10 presenting (e.g., either transmitting via a network interface 120 or indicating via a user interface 122) an indication of a relationship (e.g., sequential relationship or spatial relationship) between at least an objective occurrence type (e.g., low blood pressure) and at least a subjective observation type (e.g., observation that a person appears to be content) as indicated by the hypothesis 81*.

Figure 5C:
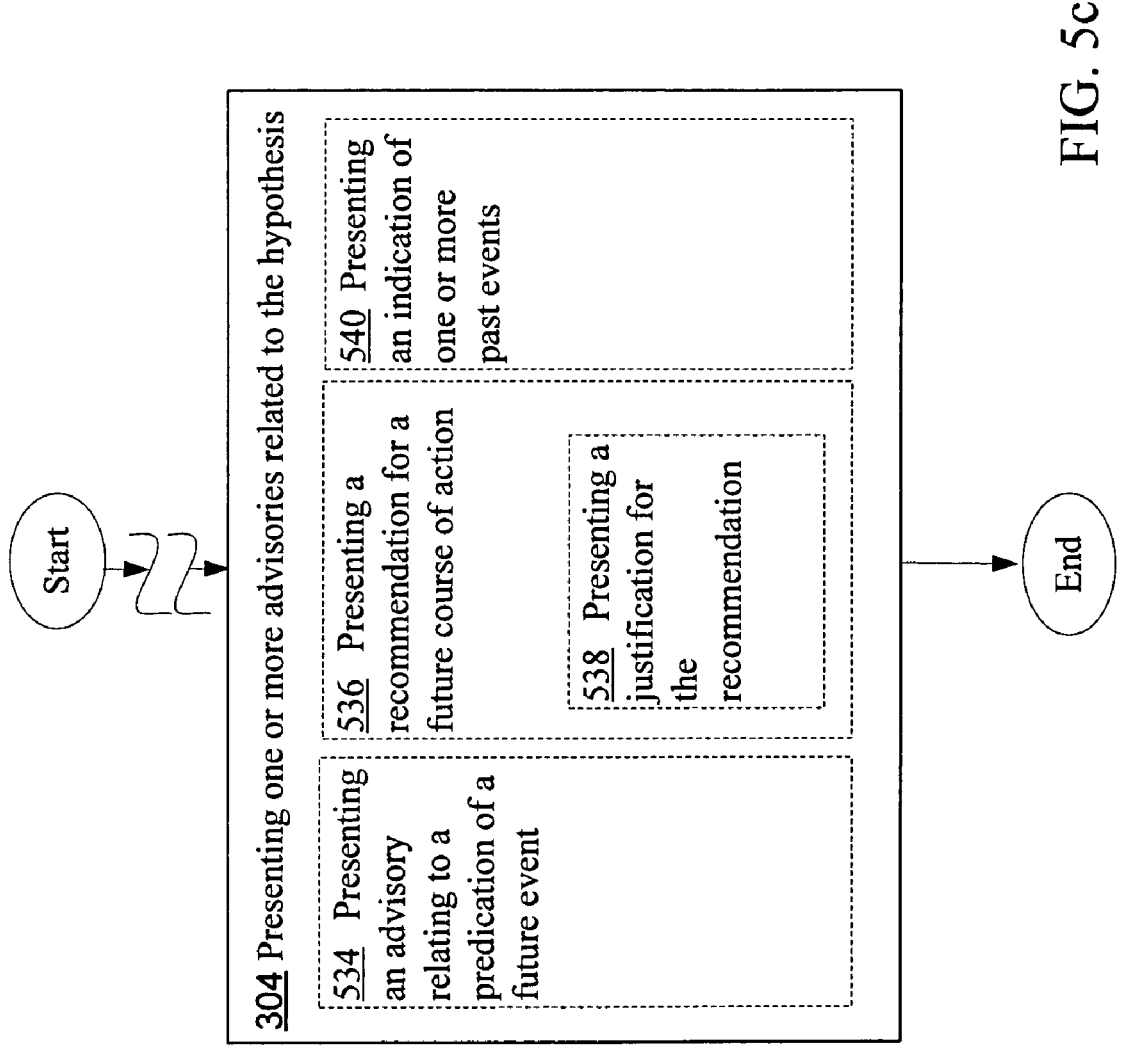
FIG. 5c is a high-level logic flowchart of a process depicting alternate implementations of the advisory presentation operation 304 of FIG. 3.

In various implementations, the advisory presentation operation 304 of FIG. 3 may include an operation 534 for presenting an advisory relating to a predication of a future event as depicted in FIG. 5c. For instance, the prediction presentation module 238 of the computing device 10 presenting (e.g., either transmitting via a network interface 120 or indicating via a user interface 122) an advisory relating to a predication of a future event. For example, based at least on the hypothesis 81* (e.g., a hangover linked to binge drinking) and the reporting of at least one reported event (e.g., binge drinking), an advisory may be presented that indicates that the user 20* will have a hangover the next morning.

In various implementations, the advisory presentation operation 304 may include an operation 536 for presenting a recommendation for a future course of action as depicted in FIG. 5c. For instance, the recommendation presentation module 240 of the computing device 10 presenting (e.g., either transmitting via a network interface 120 or indicating via a user interface 122) a recommendation for a future action (e.g., "you should take a couple of aspirins this morning").

In some implementations, operation 536 may include an operation 538 for presenting a justification for the recommendation as depicted in FIG. 5c. For instance, the justification presentation module 242 of the computing device 10 presenting a justification for the recommendation (e.g., "because you consumed a lot of alcoholic beverages last night, you should take a couple of aspirins this morning").

In some implementations, the advisory presentation operation 304 may include an operation 540 for presenting an indication of one or more past events as depicted in FIG. 5c. For instance, the past events presentation module 244 of the computing device 10 presenting (e.g., either transmitting via a network interface 120 or indicating via a user interface 122) an indication of one or more past events (e.g., "did you know that each time you have eaten Mexican food in the past, you developed a stomach ache?").

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A computationally-implemented system in the form of a machine, article of manufacture, or composition of matter, comprising:
    means for selecting at least one hypothesis from a plurality of hypotheses relevant to a user, the selection of the at least one hypothesis being based, at least in part, on at least one reported event associated with the user, wherein said means for selecting at least one hypothesis from a plurality of hypotheses relevant to a user, the selection of the at least one hypothesis being based, at least in part, on at least one reported event associated with the user comprises:
        means for selecting at least one hypothesis that relates to at least one subjective user state type; and
    means for presenting one or more advisories related to the hypothesis.

2. The computationally-implemented system of claim 1, wherein said means for selecting at least one hypothesis that relates to at least one subjective user state type comprises:
    means for selecting at least one hypothesis that relates to at least one of a subjective mental state type, a subjective physical state type, or a subjective overall state type.

3. The computationally-implemented system of claim 1, wherein said means for selecting at least one hypothesis from a plurality of hypotheses relevant to a user, the selection of the at least one hypothesis being based, at least in part, on at least one reported event associated with the user comprises:

means for selecting at least one hypothesis that relates to at least one objective occurrence type.

4. The computationally-implemented system of claim 3, wherein said means for selecting at least one hypothesis that relates to at least one objective occurrence type comprises:
means for selecting at least one hypothesis that relates to at least a type of user activity.

5. The computationally-implemented system of claim 4, wherein said means for selecting at least one hypothesis that relates to at least a type of user activity comprises:
means for selecting at least one hypothesis that relates to at least a consumption of at least one of a food item, a medicine, or a nutraceutical.

6. The computationally-implemented system of claim 4, wherein said means for selecting at least one hypothesis that relates to at least a type of user activity comprises:
means for selecting at least one hypothesis that relates to a type of exercise activity.

7. The computationally-implemented system of claim 4, wherein said means for selecting at least one hypothesis that relates to at least a type of user activity comprises:
means for selecting at least one hypothesis that relates to a type of social activity.

8. The computationally-implemented system of claim 4, wherein said means for selecting at least one hypothesis that relates to at least a type of user activity comprises:
means for selecting at least one hypothesis that relates to a type of recreational activity.

9. The computationally-implemented system of claim 4, wherein said means for selecting at least one hypothesis that relates to at least a type of user activity comprises:
means for selecting at least one hypothesis that relates to a type of learning or type of educational activity.

10. The computationally-implemented system of claim 3, wherein said means for selecting at least one hypothesis that relates to at least one objective occurrence type comprises:
means for selecting at least one hypothesis that relates to one or more types of activities performed by one or more third parties.

11. The computationally-implemented system of claim 3, wherein said means for selecting at least one hypothesis that relates to at least one objective occurrence type comprises:
means for selecting at least one hypothesis that relates to one or more types of user physical characteristics.

12. The computationally-implemented system of claim 3, wherein said means for selecting at least one hypothesis that relates to at least one objective occurrence type comprises:
means for selecting at least one hypothesis that relates to one or more types of external activities.

13. The computationally-implemented system of claim 3, wherein said means for selecting at least one hypothesis that relates to at least one objective occurrence type comprises:
means for selecting at least one hypothesis that relates to one or more locations.

14. The computationally-implemented system of claim 1, wherein said means for selecting at least one hypothesis from a plurality of hypotheses relevant to a user, the selection of the at least one hypothesis being based, at least in part, on at least one reported event associated with the user comprises:
means for selecting at least one hypothesis that relates to at least one subjective observation type.

15. The computationally-implemented system of claim 14, wherein said means for selecting at least one hypothesis that relates to at least one subjective observation type comprises:
means for selecting at least one hypothesis that relates to at least one type of subjective observation relating to a person.

16. The computationally-implemented system of claim 15, wherein said means for selecting at least one hypothesis that relates to at least one type of subjective observation relating to a person comprises:
means for selecting at least one hypothesis that relates to at least one type of subjective observation relating to at least one of a subjective mental state, a subjective physical state, or a subjective overall state of the person.

17. The computationally-implemented system of claim 14, wherein said means for selecting at least one hypothesis that relates to at least one subjective observation type comprises:
means for selecting at least one hypothesis that relates to at least one type of subjective observation relating to a type of activity performed by a person.

18. The computationally-implemented system of claim 14, wherein said means for selecting at least one hypothesis that relates to at least one subjective observation type comprises:
means for selecting at least one hypothesis that relates to at least one type of subjective observation relating to an occurrence of an external event.

19. The computationally-implemented system of claim 1, wherein said means for selecting at least one hypothesis from a plurality of hypotheses relevant to a user, the selection of the at least one hypothesis being based, at least in part, on at least one reported event associated with the user comprises:
means for selecting at least one hypothesis that was developed based, at least in part, on historical data associated with the user.

20. The computationally-implemented system of claim 19, wherein said means for selecting at least one hypothesis that was developed based, at least in part, on historical data associated with the user comprises:
means for selecting at least one hypothesis that was developed based, at least in part, on a historical events pattern specifically associated with the user.

21. The computationally-implemented system of claim 1, wherein said means for selecting at least one hypothesis from a plurality of hypotheses relevant to a user, the selection of the at least one hypothesis being based, at least in part, on at least one reported event associated with the user comprises:
means for selecting at least one hypothesis that was developed based, at least in part, on historical data associated with at least a sub-group of a population, the user being included in the sub-group.

22. The computationally-implemented system of claim 21, wherein said means for selecting at least one hypothesis that was developed based, at least in part, on historical data associated with at least a sub-group of a population, the user being included in the sub-group comprises:
means for selecting at least one hypothesis that was developed based, at least in part, on a historical events pattern associated with at least the sub-group of the population.

23. The computationally-implemented system of claim 1, wherein said means for selecting at least one hypothesis from a plurality of hypotheses relevant to a user, the selection of the at least one hypothesis being based, at least in part, on at least one reported event associated with the user comprises:
means for selecting at least one hypothesis from a plurality of hypotheses, the plurality of hypotheses being specifically associated with the user.

24. The computationally-implemented system of claim 1, wherein said means for selecting at least one hypothesis from a plurality of hypotheses relevant to a user, the selection of the at least one hypothesis being based, at least in part, on at least one reported event associated with the user comprises:
means for selecting at least one hypothesis from a plurality of hypotheses, the plurality of hypotheses being specifically associated with at least a sub-group of a population, the user being a member of the sub-group.

25. The computationally-implemented system of claim 1, wherein said means for selecting at least one hypothesis from a plurality of hypotheses relevant to a user, the selection of the at least one hypothesis being based, at least in part, on at least one reported event associated with the user comprises:
means for selecting at least one hypothesis from the plurality of hypotheses based, at least in part, on at least one reported event reported via one or more electronic entries.

26. The computationally-implemented system of claim 25, wherein said means for selecting at least one hypothesis from the plurality of hypotheses based, at least in part, on at least one reported event reported via one or more electronic entries comprises:
means for selecting at least one hypothesis from the plurality of hypotheses based, at least in part, on at least one reported event reported via one or more blog entries.

27. The computationally-implemented system of claim 25, wherein said means for selecting at least one hypothesis from the plurality of hypotheses based, at least in part, on at least one reported event reported via one or more electronic entries comprises:
means for selecting at least one hypothesis from the plurality of hypotheses based, at least in part, on at least one reported event reported via one or more status reports.

28. The computationally-implemented system of claim 25, wherein said means for selecting at least one hypothesis from the plurality of hypotheses based, at least in part, on at least one reported event reported via one or more electronic entries comprises:
means for selecting at least one hypothesis from the plurality of hypotheses based, at least in part, on at least one reported event reported via one or more electronic messages.

29. The computationally-implemented system of claim 25, wherein said means for selecting at least one hypothesis from the plurality of hypotheses based, at least in part, on at least one reported event reported via one or more electronic entries comprises:
means for selecting at least one hypothesis from the plurality of hypotheses based, at least in part, on at least one reported event reported through one or more electronic entries composed by the user.

30. The computationally-implemented system of claim 25, wherein said means for selecting at least one hypothesis from the plurality of hypotheses based, at least in part, on at least one reported event reported via one or more electronic entries comprises:
means for selecting at least one hypothesis from the plurality of hypotheses based, at least in part, on at least one reported event reported through one or more electronic entries composed by one or more third parties.

31. The computationally-implemented system of claim 25, wherein said means for selecting at least one hypothesis from the plurality of hypotheses based, at least in part, on at least one reported event reported via one or more electronic entries comprises:
means for selecting at least one hypothesis from the plurality of hypotheses based, at least in part, on at least one reported event reported through one or more electronic entries generated by one or more remote network devices.

32. The computationally-implemented system of claim 31, wherein said means for selecting at least one hypothesis from the plurality of hypotheses based, at least in part, on at least one reported event reported through one or more electronic entries generated by one or more remote network devices comprises:
means for selecting at least one hypothesis from the plurality of hypotheses based, at least in part, on at least one reported event reported through one or more electronic entries generated by one or more sensors.

33. The computationally-implemented system of claim 1, wherein said means for selecting at least one hypothesis from a plurality of hypotheses relevant to a user, the selection of the at least one hypothesis being based, at least in part, on at least one reported event associated with the user comprises:
means for selecting the at least one hypothesis from the plurality of hypotheses based, at least in part, on at least the one reported event and a second reported event.

34. The computationally-implemented system of claim 33, wherein said means for selecting the at least one hypothesis from the plurality of hypotheses based, at least in part, on at least the one reported event and a second reported event comprises:
means for selecting the at least one hypothesis from the plurality of hypotheses based, at least in part, on at least one reported event of a first event type and a second reported event of a second event type.

35. The computationally-implemented system of claim 33, wherein said means for selecting the at least one hypothesis from the plurality of hypotheses based, at least in part, on at least the one reported event and a second reported event comprises:
means for selecting the at least one hypothesis from the plurality of hypotheses based, at least in part, on at least one reported event that originates from a first source and a second reported event that originates from a second source.

36. The computationally-implemented system of claim 1, wherein said means for selecting at least one hypothesis from a plurality of hypotheses relevant to a user, the selection of the at least one hypothesis being based, at least in part, on at least one reported event associated with the user comprises:
means for selecting at least one hypothesis from a plurality of hypotheses based, at least in part, on a comparison of the at least one reported event to one, or both, of a first event type and a second event type linked together by the at least one hypothesis.

37. The computationally-implemented system of claim 36, wherein said means for selecting at least one hypothesis from a plurality of hypotheses based, at least in part, on a comparison of the at least one reported event to one, or both, of a first event type and a second event type linked together by the at least one hypothesis comprises:
means for selecting the at least one hypothesis based, at least in part, on a comparison of a second reported event to one, or both, of the first event type and the second event type.

38. The computationally-implemented system of claim 37, wherein said means for selecting the at least one hypothesis based, at least in part, on a comparison of a second reported event to one, or both, of the first event type and the second event type comprises:
means for selecting the at least one hypothesis based, at least in part, on determining a relationship between the first reported event and the second reported event.

39. The computationally-implemented system of claim 38, wherein said means for selecting the at least one hypothesis based, at least in part, on determining a relationship between the first reported event and the second reported event comprises:

means for selecting the at least one hypothesis based, at least in part, on determining a sequential link between the first reported event and the second reported event.

40. The computationally-implemented system of claim 38, wherein said means for selecting the at least one hypothesis based, at least in part, on determining a relationship between the first reported event and the second reported event comprises:

means for selecting the at least one hypothesis based, at least in part, on determining a spatial link between the first reported event and the second reported event.

41. The computationally-implemented system of claim 38, wherein said means for selecting the at least one hypothesis based, at least in part, on determining a relationship between the first reported event and the second reported event comprises:

means for selecting the at least one hypothesis based, at least in part, on comparing the relationship between the first reported event and the second reported event to a relationship between the first event type and the second event type of the at least one hypothesis.

42. A computationally-implemented method, comprising:
selecting at least one hypothesis from a plurality of hypotheses relevant to a user, the selection of the at least one hypothesis being based, at least in part, on at least one reported event associated with the user, wherein said selecting at least one hypothesis from a plurality of hypotheses relevant to a user, the selection of the at least one hypothesis being based, at least in part, on at least one reported event associated with the user is performed via at least one of a machine, article of manufacture, or composition of matter, and wherein said selecting at least one hypothesis from a plurality of hypotheses relevant to a user, the selection of the at least one hypothesis being based, at least in part, on at least one reported event associated with the user, comprises:
selecting at least one hypothesis that relates to at least one subjective user state type; and presenting one or more advisories related to the hypothesis.

43. A server, comprising:
a hypothesis selection module configured to select at least one hypothesis from a plurality of hypotheses relevant to a user, the selection of the at least one hypothesis being based, at least in part, on at least one reported event associated with the user, and wherein said hypothesis selection module is configured to select at least one hypothesis that relates to at least one subjective user state type;

a presentation module configured to present one or more advisories related to the hypothesis; and one or more processors.

* * * * *